No. 769,458. PATENTED SEPT. 6, 1904.
W. BARRY.
MAIL MARKING MACHINE.
APPLICATION FILED MAY 19, 1897. RENEWED JULY 25, 1903.
NO MODEL. 6 SHEETS—SHEET 1.
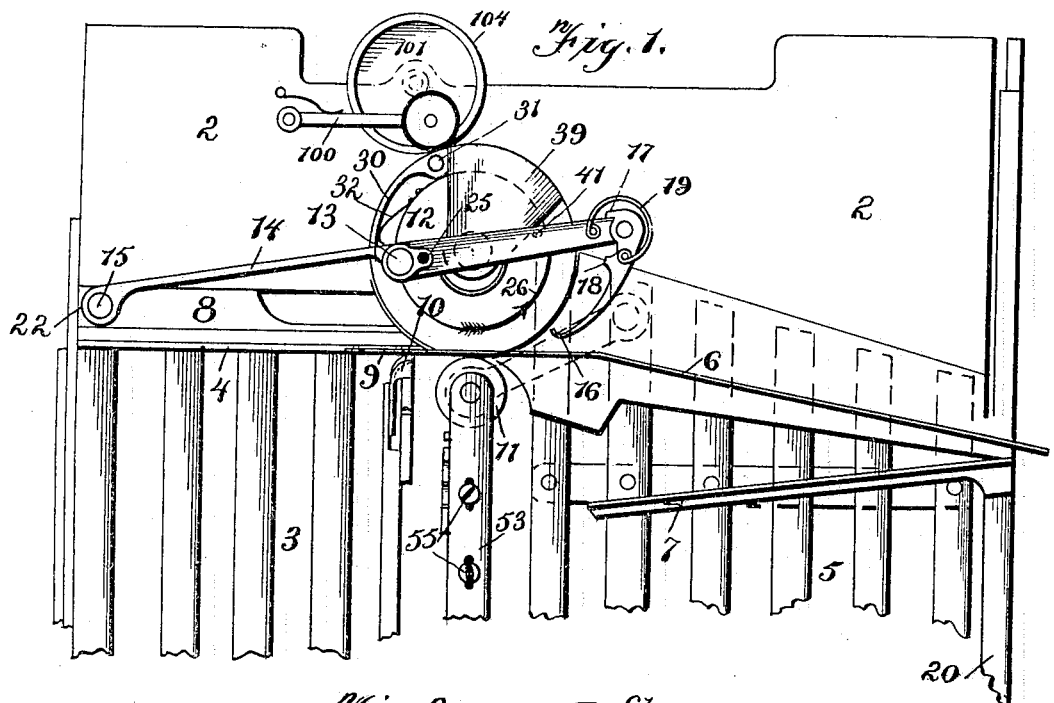
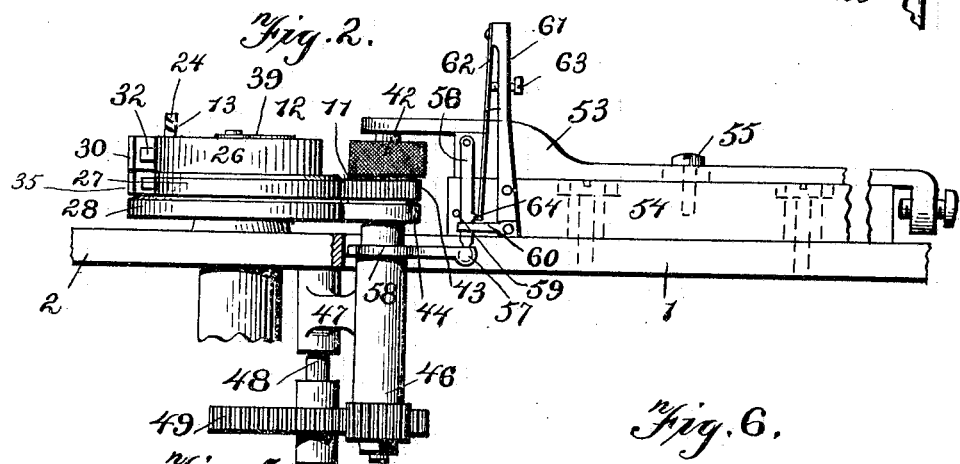
Witnesses
Geo. E. Frech.
J. M. Nesbit.
Inventor
William Barry
per Hubert E. Beck
Attorney No. 769,458. PATENTED SEPT. 6, 1904.
W. BARRY.
MAIL MARKING MACHINE.
APPLICATION FILED MAY 19, 1897. RENEWED JULY 25, 1903.
NO MODEL. 6 SHEETS—SHEET 2.
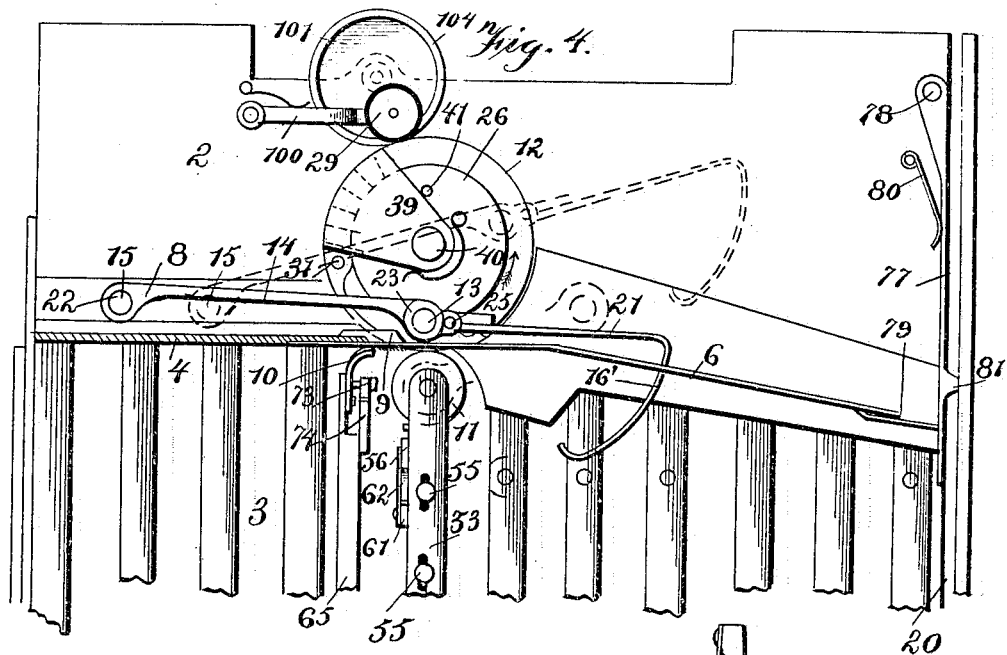
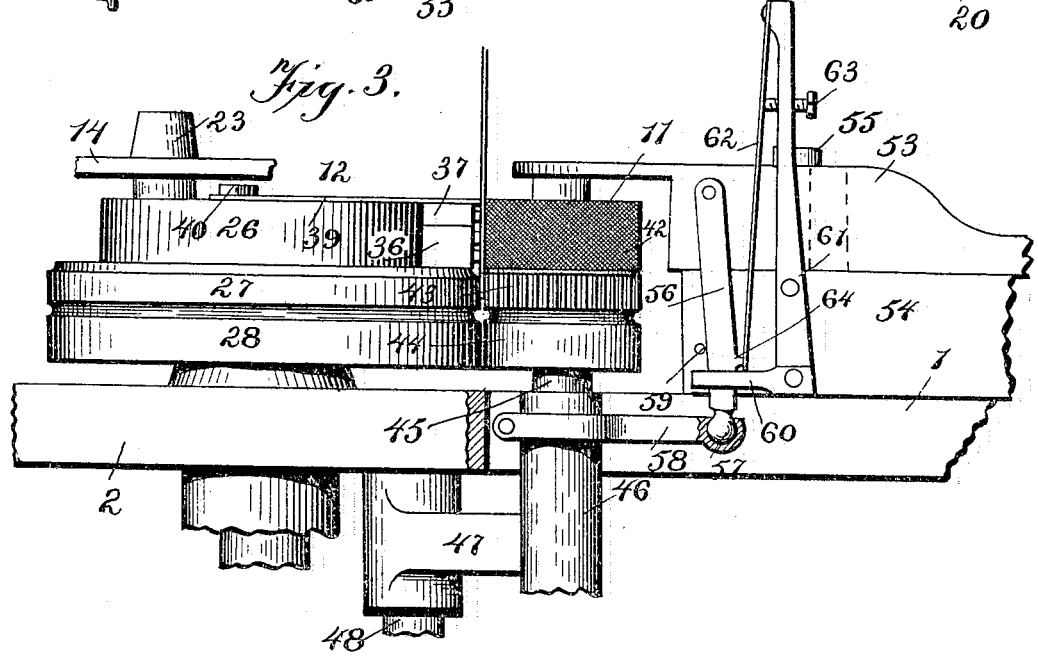
Witnesses
Geo. E. Frech
J. M. Nesbit
Inventor
William Barry
per Hubert E. Peck
Attorney

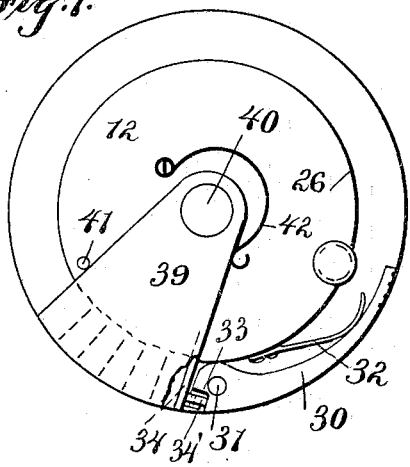
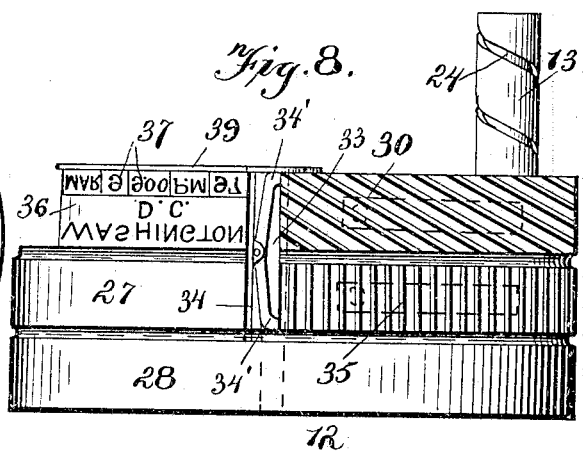
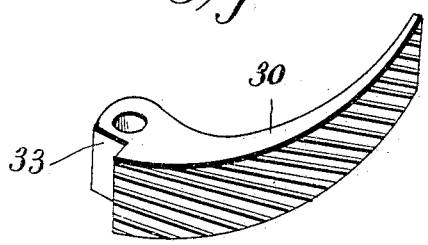
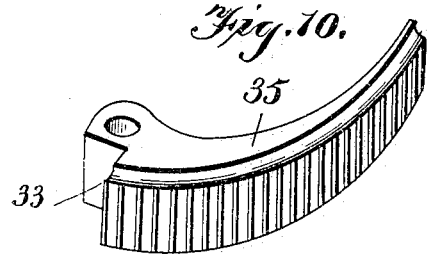
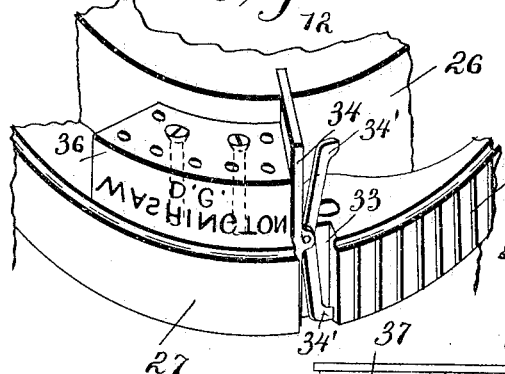
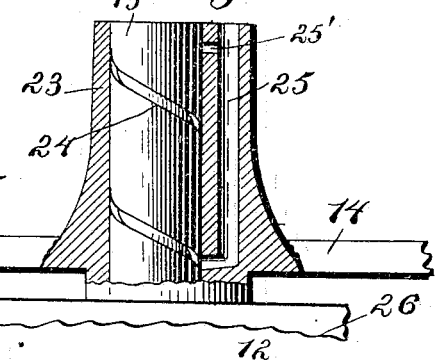
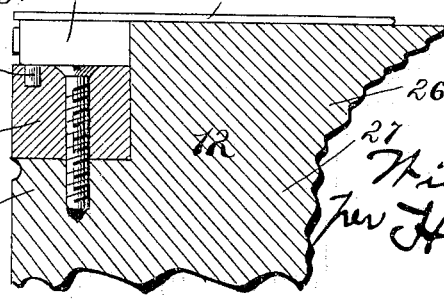

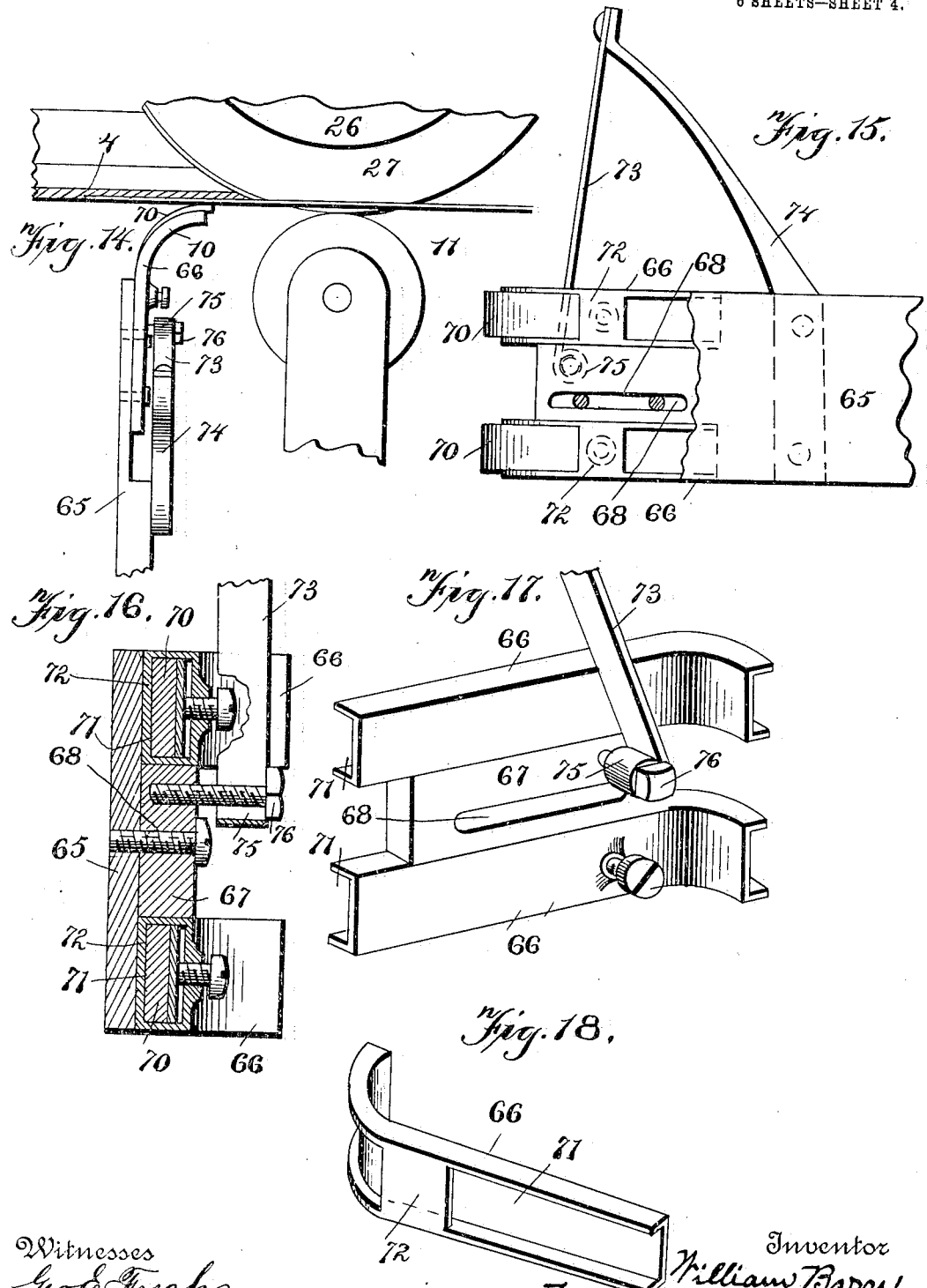

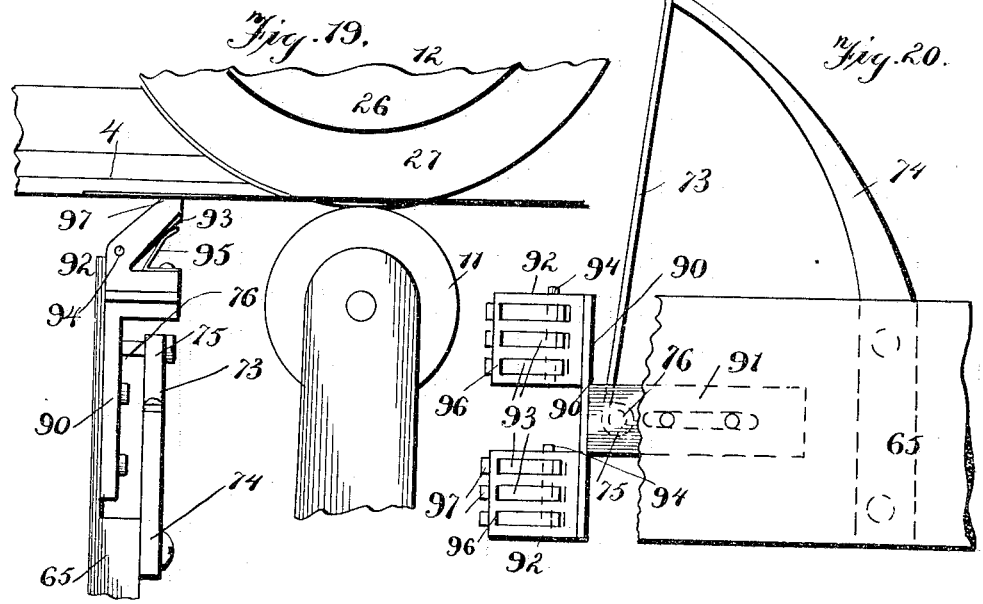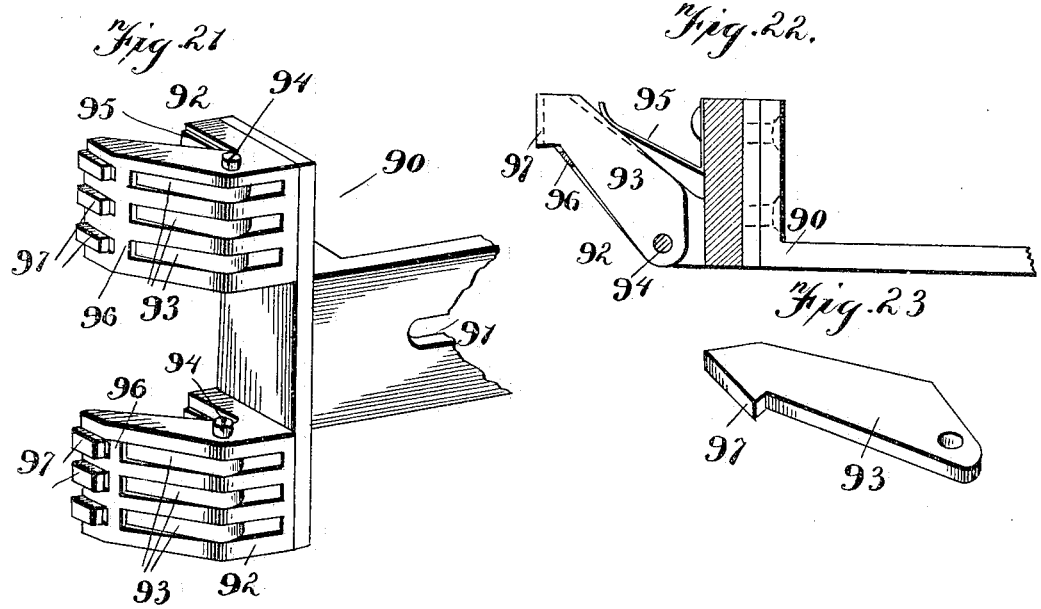

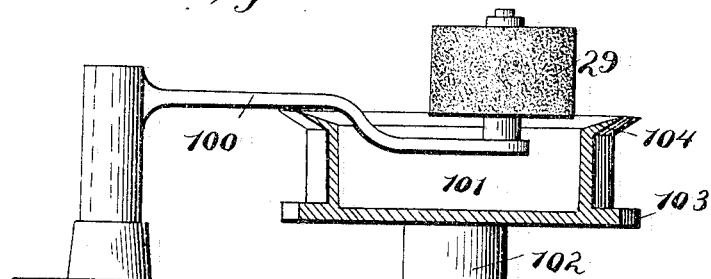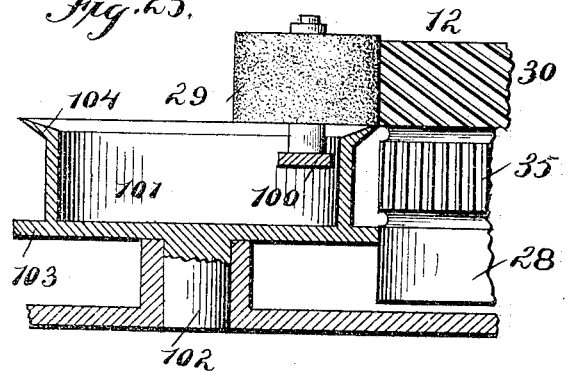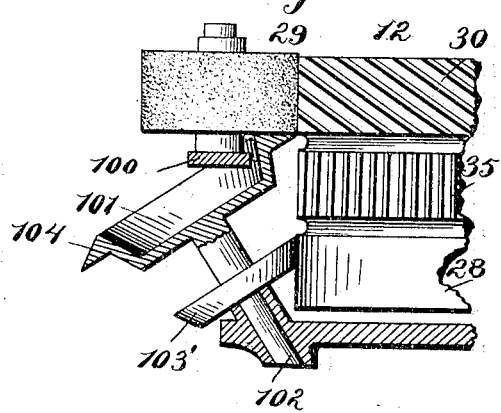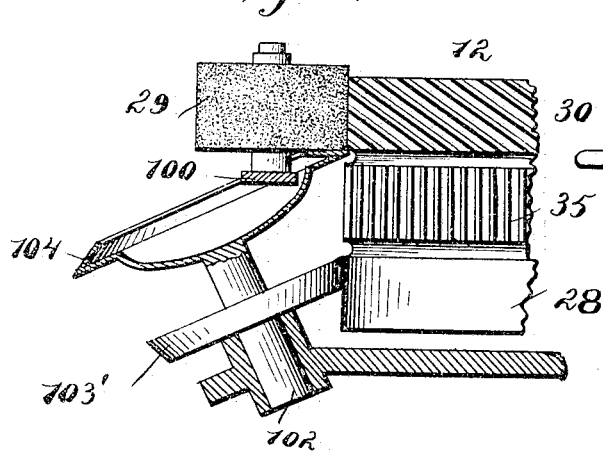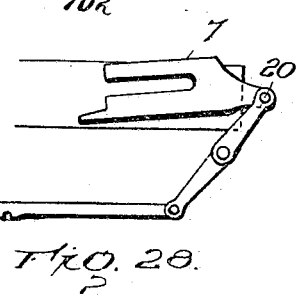

No. 769,458. Patented September 6, 1904.

UNITED STATES PATENT OFFICE.

WILLIAM BARRY, OF OSWEGO, NEW YORK.

MAIL-MARKING MACHINE.

SPECIFICATION forming part of Letters Patent No. 769,458, dated September 6, 1904.

Application filed May 19, 1897. Renewed July 25, 1903. Serial No. 167,045. (No model.)

*To all whom it may concern:*

Be it known that I, WILLIAM BARRY, a citizen of the United States, residing at Oswego, in the county of Oswego and State of New York, have invented certain new and useful Improvements in Mail-Marking Machines; and I do hereby declare the following to be a full, clear, and exact description of the invention, such as will enable others skilled in the art to which it appertains to make and use the same.

This invention relates to certain improvements in mail-marking machines.

The invention consists in certain novel features of construction, and in combinations, and in arrangements of parts, as more fully and particularly pointed out and described hereinafter.

Referring to the accompanying drawings, Figure 1 is a top plan view of the front portion of a mail-marking machine of the "Barry" type, the stacker and feeder shown at their limits of stroke in one direction. Fig. 2 is a sectional view showing the printing mechanism, the impression-surface shown in its normal withdrawn position. Fig. 3 is an enlarged detail elevation of the printing mechanism, parts being broken away, showing a letter between the rolls and the impression-surface brought up to printing position. Fig. 4 is a top plan view of the front end of a machine of the "Barry" type, showing a somewhat different construction of stacker-finger with the parts in a different position from that shown in Fig. 1, dotted lines showing a still different position of the stacker and its pitman, also showing a guard at the front end of the receiving-way, not shown in Fig. 1. Fig. 5 is a detail sectional view of the impression portion of the impression-roll. Fig. 6 is a detail section of the feeding portion of the impression-roll. Fig. 7 is a detail top plan view of the printing-roll. Fig. 8 is a detail edge view of said roll. Fig. 9 is a detail perspective of the yielding printing-section of the roll. Fig. 10 is a detail perspective view of the yielding feeding-section of the printing-roll. Fig. 11 is a detail perspective of a portion of the printing-roll, the separate type and the yielding printing-section being removed. Fig. 12 is a detail enlarged sectional view showing the crank or journal stud of the roll and the bearing of the pitman thereon. Fig. 13 is a detail sectional view through a portion of the printing-roll, showing the removable type in elevation and the large printing-block in section. Fig. 14 is a top plan view of a portion of the machine, showing a form of separator which can be employed. Fig. 15 is a detail elevation of the front portion of the inner side guide-wall of the feedway of the machine, a portion of the wall being broken away, showing the separator of Fig. 14. Fig. 16 is a detail enlarged cross-sectional view taken through said separator. Fig. 17 is a detail perspective view of said separator looking at the rear side thereof and showing a portion of its spring, the friction-strips not being shown. Fig. 18 is a detail perspective view of one of the fingers of the separator, the friction-strip not being shown. Fig. 19 is a top plan view of a portion of a mail-marking machine, showing the preferred form of separator. Fig. 20 is a detail side elevation of the inner side guide of the feedway, having its front end broken away and showing the separator of Fig. 19 in elevation. Fig. 21 is a detailed perspective, enlarged, of the separator of Fig. 19, the rearwardly-extending shank thereof being broken away and the catches shown at their limit of outward movement in the position they assume when the separator is moved back from the front guide-wall. Fig. 22 is a detail horizontal sectional view through the separator, showing one of said catches in top plan. Fig. 23 is a detail perspective view, enlarged, of one of said catches. Fig. 24 is a detail side elevation of an ink-pad and its arm, showing the guard therefor in vertical section. Fig. 25 is a cross-sectional view through the guard and arm, carrying the ink-pad and showing a portion of the printing-roll in elevation and the ink-pad engaging the printing portion thereof and resting on the edge of the guard. Figs. 26 and 27 are views corresponding to figure 25, showing, respectively, modified forms of ink-pad guards and supports. Fig. 28 is a detail cross-sectional view illustrating the means employed for adjustably mounting the outer guide-bar of the receiving-way.

In the drawings, 1 is the frame, or a portion thereof, of a mail-marking machine of the Barry type, and 2 is the forwardly-extending bed or table thereof. In this type of mail-marking machine two letter-ways are generally employed, arranged horizontally and side by side and generally terminating at their front ends in about the same vertical plane. Means are provided to feed or carry the letters forwardly in one way—the feedway—such means not being here shown, and means are also provided in the receiving-way to loosely feed or carry the letters toward the rear end thereof. A printing mechanism is interposed between the front ends of the two ways, and a feeder carries the letters, one at a time, from the front end of the feedway into the printing mechanism and through a separating device. The printing mechanism discharges the letters into and transversely of the front end of the receiving-way and a suitable stacker, properly timed, forces back each letter after it has entered the receiving-way.

3 is the feedway, wherein the letters are arranged on edge and properly faced and are constantly fed or pressed forwardly against the front end wall 4. 5 is the receiving-way, having a suitable front end wall or guide 6, and a follower 7 or other suitable means to hold the letters loosely together and in the proper position, and which gradually moves back toward the rear end of the way as the letters are stacked or packed therein. These letter-ways are provided with suitable edge or side guides, which it is not necessary to particularly specify herein.

A suitable guideway is arranged in front of and usually parallel with the end wall 4 of the letter-feedway, and on this guideway a reciprocating carrier 8 is arranged to slide or reciprocate transversely of the feedway. This carrier carries a feeder 9, preferably comprising a suitable block provided with a surface of needle-points. The end wall 4 is longitudinally slotted and the surface of needle-points projects through the slot as the feeder makes its feeding stroke and engages the front face of each letter as it is pressed against the end wall and carries the same laterally from the way along said wall and past the separating device 10 at the discharge opening or throat from said way and at the inner side of the front end thereof. The feeder at its return stroke moves the needle-points outwardly, so as not to engage the letters in the way. This feeder carries each letter into the printing mechanism, which comprises an impression-roll 11 and a printing-roll 12, the specific constructions of which will be more fully described hereinafter. The impression-roll is usually arranged behind the front wall, while the printing-roll is usually arranged in front thereof, over the bed or table 2 of the machine, and in the construction herein specifically shown these rolls usually rotate horizontally and pass the letters between them, imprinting the proper marks thereon and discharging them into the receiving-way. The printing-roll is provided with a vertical stud or crank-pin 13 rigid therewith and projecting upwardly from its upper end and mounted eccentric to the roll.

14 is a pitman or connection at one end pivotally joined at 15 to a reciprocating feeder and at an intermediate point loosely or pivotally joined to or confined on said stud or crank-pin 13 of the printing-roll in a preferred manner, which will be more specifically described hereinafter. Suitable means (not here shown) being provided to rotate the printing-roll in the direction of the arrow, it is obvious that the feeder will be reciprocated back and forth at the front end of the feedway to feed the letters one by one to the printing mechanism, as before described. The opposite end of the pitman or connection 14 is extended beyond the eccentric connection with the printing-roll to a point in front of the receiving-way and is there provided with a suitable letter-pusher, preferably in the form of a spring-finger usually extended laterally from the pitman or connection 14 toward the receiving-way. In Fig. 1 the pitman 14 is shown as rigid within itself throughout its length, and at its end extended in front of the receiving-way and beyond the printing-roll a pusher-finger 16 is at its outer end pivoted to the end of said pitman and from thence extended inwardly toward the receiving-way, so as to swing transverse to the receiving-way. This finger is curved backwardly with its free end rounded or deflected toward the printing-roll, so as to form a rounded end or extremity to engage and not catch the letters. The pivoted end of the finger is provided with stops 17 18, arranged to engage the opposite edges of the pitman and limit the outward and inward swing, respectively, of the free end of the finger. Any suitable spring, such as 19, can be secured to the pitman and to the finger to constantly and yieldingly press the free end of the finger outwardly and against the letters as the finger engages the letters in the receiving-way.

The front end wall 6 of the receiving-way is longitudinally slotted, and after each letter has been discharged into the receiving-way the pusher-finger enters the front end of said way near the letter-entrance thereinto and engages the front face of the letter and moves into the way, forcing the letter toward the rear end of the way, and at the same time moves in a curve toward the side guide or outer edge of the way, and thereby not only forces the letters rearwardly in the way, but pushes each letter toward the side guide 20 of the way, and thereby alines the letters against the same. As the finger presses in against the letters it is pressed back against the tension of its spring, and hence as the pitman starts on its return stroke to carry the finger from the way the spring still continues to hold the free end of the finger against the letter, and when the pressure of the pitman on the finger is released the spring throws the free end of the finger with a rapid quick movement toward the side guide 20, thereby giving the letter in contact therewith a quick jerk or throw toward the said guide, which materially aids in properly stacking and alining the letters. The pusher-finger moves in an encircling path into and out of the front end of the way with a return stroke outside of the way and does not enter the way until the letter has passed thereinto, so that the finger does not interfere with the free passage of the letters into the way, but presses back the letters in the way, particularly at their ends toward the letter-entrance to the way, thereby leaving ample space for each letter to freely enter the way.

In Fig. 4 the pitman and pusher-finger carried thereby are shown in different positions from that shown in Fig. 1, and also a modified construction of pusher-finger is shown, whereby the same result is attained and the number of joints, parts, &c., are reduced. In this construction a plate-spring or spring rod or wire 21 is secured rigidly to the end of the pitman projecting beyond the printing-roll and from thence extends in direct extension of the pitman and in front of the receiving-way and has its end bent laterally toward the roll and curved inwardly, with the deflected inner end to form a pusher-finger 16' of approximately the same general outline and form of the finger 16 of Fig. 1 and which also yields backwardly as it presses against the letters and also gives each letter the outward "kick" or throw toward the guide 20 as the finger starts to move out and the spring thereof recovers to assume its normal position as the pressure thereon is relieved. A most efficient stacker is thus provided and also a most simple construction is thus provided for operating a stacker and a feeder from a roll, whereby the number of parts is reduced to a minimum and also a plurality of joints and pivots are dispensed with in addition to certain other material advantages which are attained and which are of the utmost importance from a commercial and practical standpoint.

The pitman 14, carrying a presser, stacker, or pusher at is outer end, is preferably so mounted and connected that it can be easily lifted from the printing-roll and feeder when the machine is at rest. This object is usually attained by having a stud 15 extending up from and rigid with the feeder-carrier and the stud 13 of the printing-roll, and by forming the pitman with an elongated bearing 22 to slide down onto the stud 15 and another elongated bearing 23 to slide down onto and fit the stud 13. The studs are of the same diameter thoughout, and these bearing openings or boxes are properly formed in and of the metal of the pitman and usually of the same length as the studs which they fit snugly, yet so as to permit free turning thereon. By this arrangement no fastening means are necessary to secure the pitman, and hence it can be freely lifted from the studs at any time when the machine is at rest for cleaning, repair, or renewing. This is a valuable and important feature.

It is desirable to prevent the lubricant placed in the bearing-box 23 from running and wasting out onto the printing-roll with the consequent tendency of flowing onto the type and printing parts of the roll, and hence the exterior surface of the stud 13 can be formed with a spiral channel or groove 24 of such a pitch and direction that the lubricant entering the same will be constantly worked or conveyed upwardly toward the upper end of the stud and bearing and again fed down to the lower end of the spiral channel. The lubricant can be fed to the lower end of the bearing and groove through the duct 25 to one side of the bearing-opening and extending from the top of the same and discharging into the bearing-opening near its lower end and at the lower end of the thread and opening into the upper portion of the bearing-opening at 25'.

The printing-roll is preferably, although not necessarily, divided into three portions—viz., the type-carring portion 26, arranged at the upper end of the roll and reduced in diameter except where the type and small canceling-die are located, the peripheral letter-feeding portion 27 forming a circumferential concentric letter-feeding surface or portion to one side of and in a different plane from the type portion of the roll and the concentric peripheral bearing or stop portion 28, arranged to one side of the other portions of the roll and preferably at the lower end thereof and beneath the horizontal plane in which the letters travel through the printing mechanism. The printing-roll is usually mounted on the upper end of a suitable shaft and is preferably formed integral and properly turned or otherwise formed with said three portions, although it is not absolutely necessary to employ, and I do not limit myself to the employment of, the bearing portion 28 of the roll. Any suitable inker, such as inking-roll 29, can be mounted above the bed or table of the machine to engage only the type or other printing characters at the upper end of the periphery of the roll. As before stated, the upper end of the roll is reduced circumferentially in diameter, forming an annular shoulder or edge at the lower end of the type portion of the roll.

30 is the stamp-canceling die arranged at said reduced portion of the roll and just above the plane of said shoulder. This die is preferably in the form of a segmental-shaped block or plate having the printing-ribs at its outer face. The rear end of the said block in the direction of rotation is mounted on a vertical pivot 31 rigid with the roll, so that the free end of the block is free to swing in and out toward the impression-roll. A suitable yielding device is employed to constantly press the free end of the block outwardly, such as spring 32, secured to the roll with its free end forcing the block outwardly. A yielding feeding-segment 35 is arranged directly beneath the yielding printing-segment and within the plane of the feeding portion of the roll. This feeding plate, block, or segment 35 is of approximately the same size and shape as the printing-segment 30, which rests directly thereon, and is located in a recess in the feeding portion of the printing-roll and is mounted on the same pivot 31 as the printing-segment, which pivot extends up from the lower portion of the roll at the bottom of said recess containing said pivoted segments. The outer face of the feeding-segment is roughened or serrated in any suitable manner to in a measure grip and feed the letters. A spring 32 is also provided for the feeding-segment to independently press out its free end. These two springs 32 are preferably located between the inner faces of the free portions of said segments and the body of the roll behind the same, so as to independently press out their respective segments, yet the spring of segment 35 is slightly stiffer than the spring of segment 30 to hold back the printing-segment slightly. A radial plate 34 is usually secured at the rear end of the recess containing said swinging segments and just in rear of the heels or rear ends of said segments, and a rocking evener or lever 34' is fulcrumed at its central portion to said plate at a point about opposite the meeting edges of the two segments, so as to rock on an axis radial to the printing-roll. The heels of the segments are vertically recessed at 33, in front of the pivot thereof, so that the free ends of the lever or evener are arranged, respectively, opposite the radial walls of said recesses. The lever is preferably inclined inwardly from its center toward the respective segments, with its ends formed to constitute stops in engaging said walls of the recesses and limiting the outward swing of the free ends of the segments. The object of the construction is to provide a variable or evener stop mechanism for the swinging segments, so that the two segments can be forced in a suitable distance both together and at the same time, but so that if one segment is forced in the evener-stop will be thereby so moved as to permit the spring of the other segment to force said segment out an unusual distance, even a distance beyond the circle of the roll or beyond the ordinary printing-point, and hence I do not limit myself to the exact construction disclosed for this purpose, but can employ any variable or evener stop mechanism whereby one segment can move out, for the purpose hereinafter mentioned, when the other segment is forced in.

It will be observed that the ends of the evener-lever engaging the heels of the swinging segments in front of the pivot form a stop limiting the outward swing of the free ends of the segments and also that the free ends of the segments can be both forced in at the same moment, as thereby both segments move away from the evener; but if the feeding-segment 35 should be forced in without having a like force applied to the printing-segment 30 the spring of the segment 30 can force the same outwardly a corresponding distance, as the lower end of the evener-lever will follow the heel of the segment 35, thereby permitting the printing-segment to follow the upper end of the lever in the opposite direction. As the printing and impression rolls and their feeding portions rotate the front free ends of the segments first engage the letter with the impression-roll portions and yield or give inwardly, thereby permitting the rolls to grasp the letters without sudden blows and thumping and without throwing the impression-roll so far out as not to recover soon enough to supply the proper pressure during the printing operation. A printing-roll having a yielding printing-segment performs its functions and imprints a proper canceling-mark in such a machine in a far superior manner than where the same feature is held rigidly in the roll, and also material advantages are attained by providing the roll with a movable yielding feeding portion which first engages each letter as it enters the bite of the rolls.

As hereinafter set forth, the peculiar printing-roll with the yielding segments can be used in connection with a normally retracted impression-surface and a feeding-roll coacting with the feeding portion of the printing-roll and connected with or controlling the impression-surface to bring the same to operative position when a letter starts between the feeding portions, and hence should the feed-roll not be pushed back by the entering letter the impression-surface would not be moved forward to operative position. When the impression-surface is retracted, there is no coacting element opposite the swinging printing-segment, and hence as a letter enters the bite between the feeding portions of the rolls the feeding-segment 35, being lighter than the feeding-roll and its parts, might yield first before the feeding-roll, so that the impression-surface would not be instantly brought up to operative printing position; but by providing the evener-stop mechanism between the two segments the printing-segment will move out beyond the circle of the printing-roll to the impression-surface, and thereby make up for the inaction of the latter, so that the proper imprint will be started from the end of the letter and the impression-surface will be forced up before the segments have passed from the letter. It should be noted in this connection that the ordinary movement of the free ends of the pivoted segments will be very slight and only sufficient to ease the blow and jar on the rolls as the letters enter the bite thereof.

Great and material advantages are attained by employing a printing-roll with the yielding segments in connection with such an impression-roll as disclosed in my prior applications—such, for instance, as shown in my application Serial No. 562,538, wherein the feeding and impression portions are mounted on the same shaft, which is movable and pressed toward the printing-roll by a heavy spring. In such construction when the machine is running at a high rate of speed rather thick letters are apt to throw the impression-roll away or back such a distance that it does not recover quick enough to afford the proper pressure to cause an impression of the type; but the printing yielding segment is so much lighter than the impression-roll and its parts that it yields and recovers quickly and prevents such excessive movement of the impression-roll and permits the parts to adjust themselves to letters of different thickness without jumping, causing always the proper imprint to be printed on the letters irrespective of the speed of the machine and the character of the letters or other mail-matter operated on.

Just in rear of the stamp-canceling block a segmental block 36 is rigidly secured on the shoulder near the upper end of the printing-roll, and this block 36 is formed with type at its outer periphery to print the post-office or other such matter as does not require changing or renewing each day, month, or year. This block 36 does not extend to the plane of the upper end of the roll, but leaves sufficient space to receive the removable type 37 to print the year, month, day, and hour, &c., and which require changing at certain intervals. These type are preferably arranged in a single horizontal row on top of the block 36 and are each separate and each at the under side provided with a lateral projection or dowel 38 to removably enter corresponding recesses or sockets in the upper face of the block 36. By this means any one of the type can be lifted from the block separately, yet they are held with their outer printing-faces in the proper printing-circle of the roll, and they cannot be placed in the roll without being placed in their proper positions, whereby ignorant tampering with the type of the machine and changing of their proper positions is avoided. The inner ends of the type abut against the periphery of the reduced portion of the roll and are thus afforded a rigid seat to receive the impact of the type when printing. Any suitable means can be provided to lock the type in the roll, such as a plate or holder 39, arranged radially on the upper end or surface of the printing-roll and at its inner end pivoted at 40 on the upper end of the shaft of said roll, so that the plate can swing laterally over and entirely cover all of the type 37, and hence hold them positively in their proper positions against play or movement and against accidental displacement, and yet permits lateral swing of the plate over the end of the roll, so as to uncover all of the type and permit removal of any one or all of the type. A stop 41 is provided to limit the movement of the plate in one direction, and any suitable spring or other means is provided to normally hold the plate over and locking the type in their proper places. For this purpose a spring 42 is shown herein secured to the upper end of the roll and bearing against said plate and exerting a constant pressure thereon to hold the plate against the stop and entirely covering the type. Thus the spring normally holds the plate over the type, and it can only be swung from the type against the tension of the spring. Of course other means can be employed to lock or hold the plate over the type instead of the spring. The plate is formed of any suitable shape, although it is here shown as a sector of the circle of the printing-roll, with its outer curved edge flush with the faces of the type and capable of printing a line on the letter beside the row of type.

The impression-roll is also shown as made up of three portions—viz., an impression portion 42 to coact with the printing characters of the printing-roll, a feeding portion 43 beneath the impression portion and opposite and arranged to coact with the feeding portion of the printing-roll, and a bearing portion 44 beneath the feeding portion of the impression-roll and concentric therewith and arranged to engage and coact with the bearing portion of the printing-roll. However, as before stated, it is not necessary to employ these bearing or contact portions of the two rolls. The impression portion of the roll is mounted on and carried by a different shaft from the feeding and bearing portions of the impression-roll, although all the portions of the roll are arranged one beside the other, yet the impression portion need not necessarily be concentric with the feeding portion of the roll. The feeding and bearing portions of the impression-roll are preferably integral, the feeding-surface being preferably roughened or otherwise formed to grasp and feed the letters, while the bearing or contact portion 44 usually has a smooth surface. The integral roll having the feeding portion 43 and bearing portion 44 can be formed also integral with a short depending shaft 45, which passes loosely through and turns in the elongated bearing 46 in the outer end of a horizontal swinging arm 47, arranged beneath the letter-ways of the machine at a suitable angle to the path traversed by the letters passing into the printing mechanism and so that said integral roll can easily move from the printing-roll to receive the letters between the rolls. The opposite end of said arm 47 is pivoted on a depending stud or shaft 48, and suitable gearing, such as 49, couples the lower end of the shaft 45 with driving means (not here shown) to constantly rotate the roll having surfaces 43 44 with the printing-roll and in an opposite direction thereto. The said roll on shaft 45 is preferably formed hollow and open at the top or upper end. An oil-duct 50 extends down from the bottom of the chamber thus formed in the roll and opens laterally through the upper end of the shaft 45 into the upper end of the bearing 46. A layer of felt or other suitable fibrous material 51 is placed or located in the bottom of the interior of said roll over the open upper end of the duct 50. A desired quantity of lubricant is placed in the hollow interior of the roll, and a sufficient quantity thereof percolates through the felt and flows through the duct 50 to maintain the shaft 45 constantly lubricated, while the felt thoroughly filters the oil or other lubricant, and hence prevents an accumulation of dust and dirt in the oil-duct, which often occurs in mail-marking machines by reason of the flying dust and fiber from the mail-matter passing through the machine at a high rate of speed. The shaft 45 extends above the frame and its roll is arranged above the frame of the machine, and the shaft and bearing 46 move toward and from the printing-roll in a suitable opening in the frame beneath the roll and between the two letter-ways of the machine. The impression portion 42 is carried by a separate shaft or stud 52, rigid with and depending from a sliding or movable carrier 53 and extending down into the upper end of the hollow feeding portion of the impression-roll. This impression portion turns freely on said shaft or stud when driven by frictional contact with a letter or other piece of mail-matter passing between the rolls. However, this impression portion is not otherwise driven except by friction, as just mentioned. The sliding carrier or block 53 is preferably arranged in rear of the impression-roll between the letter-ways of the machine, with an arm extending forwardly over the impression portion and from which the stud 52 depends. A suitable guide or way or track is provided for said carrier 53 to permit limited reciprocation thereof toward and from the printing-roll. This track can be formed by a block 54, rigidly secured to the frame of the machine between and parallel with the ways, with the carrier slidable on the upper edge thereof and parallel therewith. The carrier can be confined in position thereon by screws 55, passed down through elongated slots in the carrier into said base 54. The inward movement of the carrier can be limited in any suitable manner, as by turning down the rear end of the carrier beyond the rear end of the base 54 and providing a set-screw 55 through said depending end to engage the rear end of the base, and thereby limit the inward movement of the carrier. The inward movement of the carrier can be varied or adjusted by moving the set-screw in or out. If desired, the base-block can also be adjusted by passing the clamping-screws holding the same to the frame through slots, as shown by dotted lines in Fig. 2.

Mechanism is provided whereby the feeding portion of the impression-roll is constantly held yieldingly to the printing-roll, while the impression portion 42 is normally held away from the printing-roll and entirely out of contact with the type or other portion of the printing-roll while the machine is operating until a letter passes between the feeding portions of the printing and impression rolls, when the impression portion will be at once forced to the proper position to receive the impact of the type and constitute a coacting impression-surface with the printing characters. By this means the impression-surface is always held out of contact with the type and away from the printing-roll except when a letter or other piece of mail-matter is interposed. Hence all danger of inking the impression-surface is absolutely avoided and yet without the employment of the objectional trip or stop mechanisms employed in other classes of mail-marking machines. For instance, as a mere example I show a specific construction for accomplishing this object, but do not wish to limit my invention strictly thereto.

56 is a lever or evener at its upper portion pivoted to the carrier 53 and from thence depending beside the same and the base 54 and at its lower end confined, preferably, by a universal connection or joint 57 with a link 58, secured to and extending rearwardly and horizontally from the bearing 46 or other part moving directly with arm 47 or the feeding portion of the impression-roll.

59 is a rigid stop extending from the base 54 to engage the front edge of the lever 56, preferably below its center, and limit its forward movement.

60 is a guide for the lever 56, extending beside the same and rigid with the base 54, to prevent outward or lateral play of the lower portion of said lever.

61 is a rigid arm extending up from and rigid with the frame and of a suitable length. 62 is a heavy plate-spring secured to and carried by said arm and depending therefrom with its free end bearing against the lever 56 at a point below the horizontal plane in which the stop 59 is located. The lever preferably has a rounded lug 64 at its rear edge against which the lower end of said spring presses, and said spring is formed and arranged to exert a constant forward pressure against said lever. A set-screw 63 can be provided to vary or control the tension of said spring. As the stop 59 is slightly above the plane of the point of engagement between the spring and rear edge of the lever, said stop acts as a fulcrum, the spring-pressure forcing the lower end of the lever forward and the upper end of the lever rearward, thereby holding the impression-surface a distance from the printing-roll and printing characters thereof, while the feeding portion of said impression-roll is held yieldingly forward against the corresponding portion of the printing-roll to properly receive and grasp the letters fed to the printing mechanism. This spring constantly holds the feeding portion of the impression-roll toward the printing-roll and in operative position with respect thereto, while the impression-surface is normally out of operative position. When a piece of mail-matter enters the printing mechanism, the feeding portion of the impression-roll is forced rearwardly against the tension of the spring 62, thereby forcing the lever 56 rearwardly from the stop 59 and shifting the fulcrum to the point of contact 64 between said spring and the rear edge of the lever, so that the lower end of the lever moves rearwardly while its upper end moves forwardly, carrying the impression-surface forwardly to operative position and yieldingly against the letter to receive the impact of the type while both the feeding and impression portions are held yieldingly and constantly pressed forwardly against the letter by the spring 62, and each can yield slightly independently of the other by reason of the spring pressing against the evener or lever connecting the two portions of the roll. The evener or lever is so arranged that the slightest movement of the feeding portion of the impression-roll away from the printing-roll or from its normal position throws the impression-surface forward to its operative position, so that when the thinnest postal cards or like matter pass through the machine the impression-surface will be properly brought forward to receive the impact of the type and cause a proper imprint on each piece of mail-matter. The thickest pieces of mail-matter the machine is capable of receiving will also bring the impression-roll forward to its operative position, but without excessive force or pressure, even though the feeding portion 43 be forced back a considerable distance, as the spring and lever in such an event permit the lever to swing from its lower end at the joint 57, the connection between the two rolls being yielding without requiring that the impression-surface always move forward a distance proportionate to the distance the feeding-roll is forced back. The fulcrum 64 is near the lower end of the lever, so that a very slight rearward movement of the lower end of the lever moves the upper end sufficiently to bring the impression-surface completely to its operative position, while continued rearward movement of the lower end of the lever and feeding-roll is taken up by the spring without causing the impression-surface to move forward beyond its operative position in accord with the continued rearward movement of the feeding-roll. It is obvious that the invention in this respect is not limited to the peculiar arrangement for mounting the spring 62, as the spring might be mounted beneath the frame or otherwise and extend upwardly, or an entirely different spring device might be employed. By this peculiar arrangement of impression-roll and lever, in connection with a separate feed-roll, a much greater spring-pressure is exerted on the feed-roll than on the impression-surface, as extra spring force is required to keep the feed-roll in proper position for the purpose of feeding the letters forward under the great speed at which the machine is run, while only sufficient pressure is applied to the impression-surface to insure a clear print without such excessive pressure as would be destructive to the printing characters. Also in this connection I wish it understood that my invention is not limited to the lever or other connection between the feed-roll and impression-surface, as great advantages are attained by the employment of an impression-surface separate from and mounted independently of the feed-roll which coacts with the printing-roll, so that the independent impression-surface can be held forward and yield independently of the feed-roll and with a light spring-pressure and be supported by an independent carrier. Thus I might provide the impression roll or surface with a light movable frame entirely independent of the feed-roll and provided with its own separate spring, as such a construction would be of great advantage, as the spring would most easily govern it and cause it to respond quickly and always maintain the proper pressure against the letter during the printing operation, and in such case the impression-surface would be normally maintained in operative position by its independent carrier and shaft separate from the feed-roll. Those skilled in the art will readily understand that the oscillating lever between the impression-surface and member within the path of the letters and moved aside by each advancing letter is provided with a yielding fulcrum or is directly spring-pressed at a point intermediate of said surface and said member, although my invention is not specifically limited to said arrangement, and also other means can be employed than a feed-roll to constitute the member in the path of or moved by each advancing letter to bring the impression-surface up to operative position, and that such element or member can be variously located with respect to the impression-surface and can be variously shaped, constructed, and mounted without departing from my broad invention in this regard, and also that the invention is not limited to employment with the peculiar printing-roll described nor in the peculiar mail-marking machine shown.

The impression-roll is not driven except by frictional contact with the passing letters, and I also provide an improved impression roll and surface of general application independent of other constructions and features in that the impression-surface 42' is composed of a hard-metal ring or open-end cylinder forming the periphery of the roll and is carried by a rubber backing $42^2$ on an elongated central tube or bushing $42^3$, usually extended above and below the roll and mounted and turning on the stud or shaft 52. In making the roll the rubber roll $42^2$ with the central hole is first placed on the metal sleeve or bushing, so as to be fixed thereto and turn therewith, and the rubber roll is then dressed or turned down to the proper size, and the thin metal ring or cylinder 42' is then forced over the rubber roll, so as to turn therewith and be fixed thereon and form the periphery or circumference of the completed article as a single roll with the parts firmly united with the rubber preferably extending out to the ends of the roll or flush with the ends of the metal ring or cylinder. The many advantages of such a construction of impression-roll are obvious, as the hard-metal surface can yield toward and from the printing-roll and rock vertically independently of its shaft when the pressure is greatest at either end of the roll, thus permitting the impression-surface to easily accommodate itself to uneven surfaces and always present a proper impression-surface without the employment of metal springs or joints. It is obvious, however, that the invention in this respect is not limited to the use of rubber, as other equivalent material can be employed.

An independent feature of the invention of general adaptability is the improved hard-metal impression-surface composed of a divided, hard, smooth, true surface made up of a plurality of fine points or ridges, each smooth at the outer face and the outer face of each within the circle of the roll. In making the hard-metal ring the ring is first turned from steel with a slightly greater external diameter than in the completed article. Then with a fine milling-tool the outer surface or periphery of the ring is milled to form the divided impression-surface, made up of a face of closely-arranged points, ribs, or projections, usually individual points formed by cross-grooves. The operation of milling throws up a bur, feather, or rough biting-surface, which would prevent the employment of such a surface as an impression-surface. Hence the milled surface of the ring is then hardened by any improved process, and after hardening the rough milled surface is ground down true and to the proper diameter, and so that all roughness and bur is removed and the outer ends of all the points or projections are left smooth and each ending in the circle of the circumference of the ring. A smooth hard surface is thus produced devoid of roughness or biting burs and yet composed of a plurality of fine points which will not take up ink even if any should be presented thereto and which will not daub or smear ink on the letters or pieces of mail-matter engaged thereby. However, although I prefer to employ the hard-metal impression-surface, yet it is not absolutely necessary that such a surface be employed in connection with my present construction, wherein the impression-surface is held normally away from its operative position, and I do not limit my invention in this respect, although the impression-surface and its mounting form an important feature of the invention disclosed herein.

In Figs. 14 to 18, inclusive, an advantageous construction of separating mechanism is disclosed, wherein the number of joints and springs employed are reduced to a minimum and objectionable swinging movement of the fingers or letter-engaging faces is avoided. The inner side wall 65 of the letter-feedway ends a short distance in rear of the front wall of said way to form the throat or letter-discharge passage from said way, the letters passing from the way along and guided by said front end wall to the printing mechanism. The separating mechanism comprises a reciprocating frame arranged loosely at the outer face of said wall 65 and arranged to project across said throat to the front guide-wall and to reciprocate to and from the same. The frame is yieldingly held forwardly to said guide-wall by a suitable spring and at its front end has the fingers or surfaces 66 beveled at the inner face forwardly toward said wall and rearwardly or in the direction the letters travel to the printing mechanism. The drawings show two such fingers or surfaces arranged one above the other with a proper space between for the passage of the feeder in its reciprocation between the printing mechanism and front end of the letter-way. In rear of the throat or letter-discharge passage said fingers are rigidly secured together, as by the block or connecting-web 67, and the fingers from the throat extend rearwardly along the outer face of the wall 65 and are loosely confined thereto and are suitably guided to hold them in the proper positions and yet permit free reciprocation thereof toward and from the front guide-wall. Each finger can be formed of a metal plate or holder having the straight portion or shank at the outer face of the wall 65, with the front end curved forwardly and rearwardly in the letter-discharge passage, so that the letters pressed against said front curved edges will exert a wedging action on the separator in forcing the same back to permit the passage of one letter at a time to the printing mechanism. The straight portions or shanks of the fingers are shown connected by a plate or web 67 at the outer face of the wall 65. This web is formed with a longitudinal slot 68, through which guiding and confining pins 69 are passed into the wall 65, which permits the free reciprocation of the separator, but holds the same in its proper vertical position and against tilting or rocking. The outer curved letter engaging and holding ends of the fingers can perform their proper functions by presenting metal surfaces to the letters to hold back all letters behind the particular one being fed and carried by the feeder-block. However, in the drawings the fingers are shown provided with friction material 70, to engage and hold back the letters; but the invention is not limited to the employment of such or other additional friction material or facing. Each finger is shown provided with a longitudinal groove or channel 71 along its inner face and curved end to receive a strip of rubber 70 or other suitable friction material which can be fed or adjusted along the groove as the material wears away at the front end. At the curved face of each finger the groove is formed of such depth as to prevent the friction material engaging the letters except at the extreme front end of the finger, where the side walls of the groove are cut away, so that the front end of the friction material can press against the front guide-wall and can press against and rub along the rear face of the letter carried along the guide-wall by the feeder and will thereby hold back the letters behind the one being fed. Any suitable means can be provided to adjustably clamp each rubber strip. For this purpose a bridge 72 can be formed across the channel or groove of each finger and a clamping-screw passed through the outer side of the finger against a plate to clamp the rubber against the bridge. A single spring 73 can be employed to yieldingly hold the separator forward with its front end against the guide-wall. This spring is usually secured at one end to a suitable support, such as 74, with its free end arranged in rear of the front curved ends of the separator and exerting a forward tension. The spring is formed with a transverse eye 75 in its free end, through which a screw 76 can be loosely passed into the web 67. The diameter of the screw 76 is less than the internal diameter of the eye 75, so that the separator can move in its horizontal path without moving in the arc with the free end of the spring. The invention is not limited to the plate-spring depending from an overhead support, as the spring and support can be otherwise arranged without departing from the invention.

The outer side guide-rod 20 of the receiving-way is usually carried by swinging arms, so that the entire rod can be moved in or out transversely of the way to accommodate large or small letters. The rod swings a distance above the floor of the way when moved inwardly, so that letters sometimes work under it, and when swung a distance outwardly letters sometimes double at their outer ends and work out forwardly between the guide-rod and front end wall of the way. The said arms, which carry said guide or stop rod 20 in an elevated position above the plane of the floor of the letter-way, are fulcrumed to the frame to swing in planes transversely of the way, and devices are provided to swing the arms, and consequently said rod 20, transversely of the letter-way. For instance, my Patent No. 585,076, dated June 22, 1897, shows the guide-rod mounted and controlled as hereinbefore referred to. The sleeve of the follower 7 slides longitudinally on said guide-rod, and consequently when the guide-rod is adjusted transversely of the letter-way said follower also moves a corresponding distance transversely of said way. In Fig. 4 a device is shown which moves in and out with the guide-rod and is intended to hold the letters in their proper positions in the receiving-way and to obviate the necessity of an adjustable stop at the front end of the way requiring a separate operation to adjust and which I have employed in some of my machines in use. The device shown in Fig. 4 comprises an elongated plate 77, arranged on edge and extending forwardly over the front table of the machine and in front of the receiving-way and at its front end mounted on a pivot at 78, so that the free end of the plate can swing toward and from the guide 20. The free end of the plate extends inwardly through the longitudinal opening of the front wall of the receiving-way, and the plate extends along the inner side of the guide-rod 20 and is of sufficient height to close the space beneath said guide-rod and prevent the letters crowding beneath the same. A wing 79 extends laterally from the plate at a point in advance of its front end and in the opening in the front wall and toward the inner side of the way. The inner end of the wing is preferably deflected forwardly. A spring 80 can be provided to constantly press the plate toward the guide-rod, while a projection 81 extends up from the plate and engages the inner side of the guide-rod, so that the plate follows the guide-rod in its in and out movements automatically without any separate adjustments or operations. The wing closes the opening through the front end wall, near the outer end of the wall, and also serves to uphold the front letters in the receiving-way.

In Figs. 19 to 23, inclusive, I show the preferred form of separator comprising a sliding or reciprocating frame approximately as disclosed in Figs. 14 to 18, but having series of spring-metal catches or retainers carried by the beveled metal fingers or blocks. A metal frame 90 is provided at the end of the side wall 65, having a rearwardly-extending shank confined loosely beside said wall to guide and steady the frame in its reciprocation, as in said previously-mentioned construction. The front end of the frame has the separated metal fingers or blocks 92 92 arranged a distance from each other and projecting forwardly to the guide-wall 4 and having the beveled faces at the feedway side to be engaged by the letters in said feedway, which wedge back the separator to permit the passage of one letter at a time along the guide-wall 4. Each finger or block 92 is formed with a series of parallel horizontal slots with a series of spring fingers or retainers 93 mounted therein. These fingers or retainers swing toward and from the feedway and are pivoted at their inner ends in the blocks 92 on the pivots 94, while springs 95 constantly press their free projecting ends toward the feedway and against stops 96. The fingers project forwardly beyond the front ends of the blocks 92, and each finger 93 at its edge toward the feedway is provided with a notch or shoulder 97, facing toward the feedway and in the opposite direction to that in which the letters move in passing the separator. Suitable spring mechanism—such, for instance, as shown in Figs. 15, 16, and 17—can be provided to constantly press the front ends of the blocks 92 toward and against the guide-wall 4 or the letters passing therethrough, so that said shoulders at the ends of the spring-retainers will catch the ends of the letter or several letters immediately behind the one being fed and will hold back said letters, while the one being fed will easily slide on past the same. As the fingers are inclined outwardly and rearwardly from their pivots, they will not retard the forward movement of the letter grasped by the feeder should its edge be caught by them, but will swing back and release the same, but will present sufficient resistance to other letters to prevent the passage of two letters at a time past the separator. As shown in Fig. 19, the ends of the wedge or cam shaped fingers or blocks are normally pressed against the guide-wall, the catches being withdrawn. Consequently the spring mechanism forcing the separator forwardly is of greater strength than all the springs 95 pressing the catches 93 outwardly. It should be noted that the reciprocating separator-frame is provided with letter-retarding means, which can be composed of friction material or one or more spring-actuated movable stops or catches or other devices, and that the reciprocating frame constitutes the separating device of the machine between the feedway and printing mechanism, no other separating devices, such as reversely-rotating rolls, being necessary. The term "reciprocating separator" is herein employed to distinguish my present invention from that class of separators which swing back on a center or pivot under the pressure of the advancing letters. Usually pivoted fingers carrying shoulders have been employed for this purpose pivoted at the front ends of the side guide-wall of the letter-feedway. (See my patent No. 585,075, dated June 22, 1897.) These fingers swing back as a gate, and consequently the angle of the stop shoulders or fingers with respect to the letters constantly changes as the fingers swing back, so that letters behind the one being fed are very apt to slip past the ends of the fingers when pushed back, thus permitting the objectionable "skipping" of letters by the printing mechanism. In the present invention the separator maintains its angle with the letters and the front guide-plate whether a thick or thin letter is passing through and whatever the location of the separator within its path of movement. The separator-frame preferably moves in a vertical plane at right angles to the path of the letters and to the front guide-plate. As the separator-frame does not swing back, the faces or shoulders of the catches are always maintained at the same angle with respect to the letters and extend squarely or at right angles across the path of the letters and catch the ends thereof and only swing back under the pressure of the particular letter gripped by the feeder and in view of the superior force moving the feeder. When the catches swing back under the pressure of this superior force, the swing or movement thereof is very slight; but as the shoulders or faces thereof are inclined rearwardly the letter slips past. However, as the separator-frame is pressed back in a straight line the catches bear against the rear face of the letter and maintain the proper angle to hold back letters behind the one being fed and separate them from the one being fed should the letters be stuck together. It should be noted that the reciprocating separator presents letter-retarding means with extensive or elongated faces or portions to catch, hold, or stop the ends of letters in contradistinction to the mere bite between a feeding-roll and a curved or circular face pressing letters to the roll for the sole purpose of maintaining sufficient frictional hold of the feeding-roll on the letters. Material advantages are attained by employing a support to one side of the separator-frame and in a vertical plane parallel with the vertical plane of the separator and in securing a vertically-disposed plate-spring to such support and confining the free end of the spring to the separator-frame. Such an arrangement allows free access to the parts and allows them to be easily cleansed, and the spring can be easily removed and replaced, and the compactness of the machine is maintained and permits the reduction of friction by employing a very short shank for the separator-frame.

In Figs. 1, 4, and 24 to 27, inclusive, I show several forms of inking device comprising a guard or shield for the ink pad or roll, which also actuates the same and holds it in proper position. The ink-pad 29 is carried by a swinging arm 100, fulcrumed at one end to the forwardly-extending bed of the frame and provided with any suitable spring device to yieldingly hold the ink-pad to the proper position to engage and ink the printing characters of the printing-roll. The ink-pad usually consists of felt clamped between heads and having a central tube or bushing turning on a stud in the free end of said arm 100, and after some use the face of the pad soon bushes or flares out and is exceedingly apt to daub ink on other portions of the printing-roll than the printing characters, particularly on the feeding-section of said roll immediately below the printing-section, and to scatter ink over the front bed of the frame beneath the pad. To overcome this difficulty, I provide a shield arranged beneath the pad and engaging the lower end of the pad just beneath its point of engagement with the printing characters and extending to the roll just above the feeding portion thereof, so as to uphold the edge of the pad from extending or flaring down onto said feeding portion and arranged between the pad and said feeding portion of the roll. This shield can consist of a cup-shaped or hollow open-top roll 101, considerably larger in diameter than the ink-pad and having a central depending journal 102, mounted in a suitable bearing in the frame, and a circular friction driving-flange 103 in engagement with the bearing portion of the printing-roll, whereby the guard is constantly rotated by said printing-roll. Around its upper edge the shield is provided with the circular outwardly-inclined flange 104, engaging the printing-roll just above the feeding portion thereof. The arm 100, carrying the ink-pad, is deflected upwardly over said shield, so that the ink-pad is arranged over the shield or within the open top thereof and eccentrically thereto, with one side of its lower edge resting on the flange 104, whereby the ink-pad is rotated by contact with said flange and is upheld by said flange in its proper position and entirely away from and out of contact with the feeding portion of the printing-roll and ink cannot be scattered from the pad over the printing-roll or bed of the machine; but any such ink is caught by the large shield. The rapid rotation of the ink-pad effects a better distribution of the ink over the printing characters of the printing-roll. In Fig. 26 the shield is shown mounted in an inclined position on an inclined shaft or journal, which carries the friction driving-flange 103', and in Fig. 27 the shield consists of a plate 101', mounted at an inclination and having the inturned top edge flange 104' to support and drive the ink-pad and protect the feeding portion of the printing-roll. It is preferred that the ink-pad should have a higher rate of speed than the peripheral speed of the printing-roll. The ink-pad supports and drivers shown, for instance, in Figs. 26 and 27 thus rotate the ink-pad at an increased speed.

The normally withdrawn impression-roll with mechanism operated by each letter as it is carried into the printing mechanism, to move said roll to operative position, is not claimed in this application broadly, but forms the subject-matter of a divisional application filed by me October 26, 1897.

It is evident that various features hereinbefore set forth are of general application in various kinds of machines and that their use is not confined to mail-marking machinery and also that the peculiar stacker is independent of any particular construction of printing-roll or mail-marking machine and can be actuated by any eccentric rotary connection in connection with proper controlling means not necessarily the reciprocating feeder which accomplishes that purpose in the specific construction shown in the drawings and that the stacker pitman or connection does not necessarily under my invention also reciprocate a feeder, also that various changes and variations might be made in the forms, constructions, and arrangement of the parts described without departing from the spirit and scope of my invention. Hence I do not wish to limit myself to the specific constructions herein set forth.

Having thus fully described my invention, what I claim as new, and desire to secure by Letters Patent of the United States, is—

1. In combination, a receiving-way, mechanism to deliver mail-matter thereinto in an upright position, a stacker comprising a spring or yielding letter-engaging portion yieldingly held at its limit of movement toward the letters, and positively-moving actuating and controlling mechanism arranged to carry said portion of the stacker in an endless or encircling path into and out of the path of the letters to press the letters in said way and thereby cause said portion to yield and then recover as it is moved back away from the letters, substantially as described.

2. A receiving-way, in combination with a swinging connection in front of said way, rotary eccentric driving means for said connection, a curved yielding pusher-finger extending from said connection toward the front end of the way and carried thereby into and out of the front end of the way, and controlling means, substantially as described.

3. A receiving-way, in combination with a swinging connection or pitman having its free end extending transversely in front of the receiving-way and provided with a lateral pusher-finger extending toward said way, the opposite end of the pitman provided with controlling means confining the pusher-finger to move in an encircling path into and out of the front end of the way, and rotary actuating means eccentrically connected to an intermediate portion of said pitman substantially as described.

4. A receiving-way, in combination with a swinging member arranged in front of and controlled to swing toward and from the receiving-way, and a yielding inwardly-projecting curved pusher-finger carried by the free end of said arm and arranged to swing into and out of the front end of the receiving-way and engage the letters with its outer convex edge, substantially as described.

5. A receiving-way, in combination with a swinging member arranged in front of and controlled to move toward and from the way, and a yielding inwardly-projecting pusher-finger carried by the free end of said member and having its free end deflected rearwardly and carried transversely of and into and out of the front end of the way by said member, substantially as described.

6. A stacker comprising a movable member having a curved yielding pusher-finger extending laterally therefrom, and arranged to yield as it presses against the letters, as and for the purposes set forth and actuating means for said movable member, substantially as described.

7. In a mail-marking machine, the combination, a printing mechanism, a reciprocating feeder carrying the letters to the printing mechanism, a receiving-way into which the letters are discharged from the printing mechanism, a pitman provided at an intermediate point with rotary actuating means, said pitman at one end connected to actuate the feeder and having its opposite free end extending in front of the receiving-way and provided with a pusher-finger extending inwardly and laterally from the pitman and rigid therewith and carried thereby, substantially as described.

8. A receiving-way, in combination with actuating means, a movable member having a yielding pusher-finger extending laterally therefrom to move into and out of the way, the free end of said finger deflected rearwardly so that the finger will yield as it presses against the letters and is forced in by the member and will continue to press in against the letters as the member moves in the opposite direction and the spring or tension of the finger reacts or recovers, substantially as described.

9. In a mail-marking machine, the combination of a feeder, a printing-roll, a pitman at one end pivotally joined to the feeder and extending over and beyond the roll and pivotally joined eccentrically thereto, and a pusher-finger extending laterally directly from and forming the free end of the pitman, substantially as described.

10. In a mail-marking machine, the combination of a letter-feedway, a receiving-way, a printing mechanism comprising a rotary printing-roll, a feeder, and a pitman operating the feeder from the printing-roll and at its free end provided with and entirely supporting and carrying a pusher-finger, substantially as described.

11. In a mail-marking machine, the combination of a feeder, a rotating roll, a pusher-finger, and a removable pitman carrying and entirely supporting said finger and operating the feeder from said roll, substantially as described.

12. In a mail-marking machine, the combination of a reciprocating feeder, a rotary roll having a stud rigid with one end of the roll and eccentric thereto, a stud rigid with the feeder, a pitman having elongated bearings to receive said studs and removably rest thereon so that the pitman can be lifted therefrom, and a pusher-finger secured to and carried by the free end of the pitman and removable therewith, substantially as described.

13. In mail-marking machines, the pitman actuating the feeder from the printing-roll having one end extended and provided with a yielding pusher-finger directly secured thereto and carried entirely thereby in combination with a feeder and a printing-roll, substantially as described.

14. A receiving-way, in combination with a horizontally-disposed movable member arranged in front thereof and carrying a bent or curved yielding or spring-presser finger moving into and out of the way and eccentric actuating means carrying said member, substantially as described.

15. A stacker comprising a positively driven and controlled swinging member having a pusher-finger in direct continuation of and rigid with its end, said finger deflected laterally and a rotary member on which said swinging member is eccentrically mounted, substantially as described.

16. A printing-roll having an edge recess opening through the edge and an end of the roll, removable type to fit in said recess in printing position, and a freely-swinging plate arranged on the end of the roll to swing over the type and confine them in said recess, substantially as described.

17. A printing-roll having an edge recess opening through an edge and an end of the roll, removable separate type arranged to fit in said recess and to removably interlock therewith against outward movement so that the edges of the type are approximately flush with the end of the roll, and a freely-swinging plate arranged on said end of the roll and arranged to swing over the type and hold them in position and provided with means to normally hold the plate over the type, substantially as described.

18. A printing-roll having an edge recess opening through an end of the roll and formed with sockets in its floor, removable type to fit in said recess having dowel-pins to removably enter said sockets and hold the type against radial movement, and a laterally-swinging segmental plate on the end of the roll arranged to removably cover said type and prevent movement from the end of the roll, substantially as described.

19. A printing-roll having a recess to removably receive type and opening through an end of the roll, separate removable type arranged to fit radially in said recess with their outer faces approximately flush with the end of the roll, and a yieldingly-held freely-swinging plate arranged on the end of the roll and yieldingly held over said type to hold them in the recess, substantially as described.

20. A printing-roll having an edge recess having sockets in the floor of the recess, removable type, each having a pin or projection from one side to enter a socket in the floor of the recess, the inner end of the type resting against a rigid portion of the roll, so that any type can be lifted from the recess and at the end of the roll, and a laterally-swinging plate at the end of the roll over the upper faces of the type to hold them in position whereby the plate can be swung laterally to expose the type.

21. A printing-roll having a radial recess opening through an end of the roll, removable type formed to interlock with the floor of said roll to hold the type against radial movement yet permitting the removal of any type from the end of the roll, the outer faces of the type flush with the end of the roll, a swinging plate on the end of the roll, a spring yieldingly holding said plate over the type, and a stop to limit the swing of the plate in one direction and leaving it free to swing against the spring in the opposite direction to uncover the type, substantially as described.

22. A printing-roll having an edge recess opening through an end of the roll, a printing-block fitted and secured removably in said recess with its outer edge ending a distance from the end of the roll, a row of removable printing-type arranged on said outer edge of the block and each having a projection entering the same, and means removably confining said type in printing position, substantially as described.

23. A printing-roll provided with a printing-die fixed thereto, and in advance thereof having its periphery provided with a yielding segmental portion under constant outward pressure, substantially as described.

24. A printing-roll having a yielding section forming a portion of its periphery, means normally and yieldingly holding said section to its limit of outward movement, said section being pivoted near one end to said roll, thereby enabling the material passing the roll to ride up on said section, substantially as described.

25. A printing-roll having its periphery provided with a radially-movable printing-segment yieldingly held out to printing position so as to yield inwardly as it strikes each piece of mail-matter and a printing-die arranged in rear of said segment, substantially as described.

26. A printing-roll having a segmental stamp-canceling die movable radially and yieldingly held outwardly and pivoted at or near its rear end whereby the free end of the segmental die yields inwardly on striking a letter and rides on the letter to its pivoted end, substantially as described.

27. An impression-roll mounted to yield, in combination with a printing-roll having a printing-die and mounted on a shaft in rigid bearings and provided with a radially-movable peripheral portion yieldingly held out to and capable of moving beyond the circle of the roll, substantially as described.

28. A yieldingly-held impression-roll of a mail-marking machine, in combination with a printing-roll coacting therewith in grasping and printing the letters mounted in fixed bearings and having a fixed printing-die, the portion of the periphery of the printing-roll which first engages and takes hold of each letter entering between the rolls, formed movable radially and yieldingly held out to the circle of the roll so as to yield or give inwardly as each letter enters the rolls and thereby avoid the sudden shock and outward throw of the impression-roll, substantially as described.

29. A printing-roll having a circumferential recess at one end, printing-type occupying a portion of said recess, a segmental stamp-canceling die in said recess in advance of the type and pivoted at its rear end to permit radial swing of its front end, and means yieldingly holding the front end of said die outwardly to printing position and permitting inward yielding thereof, substantially as described.

30. A printing-roll having a printing portion at one end thereof having type and a swinging yieldingly-held stamp-canceling die, and a circumferential letter-feeding portion to one side of the printing portion and having a swinging yieldingly-held portion beside said die so that said die and yielding feeding portion yield or swing inwardly when they strike or take hold of each letter, substantially as described.

31. A roll having the concentric feeding circumference, a section thereof being movable and consisting of a segment forming a part of and normally within the periphery of the roll and pivoted at its rear end so that its front end can yield radially, a spring or yielding device yieldingly holding the segment to its limit of outward movement with its outer feeding-surface about within the circle of the circumference, a stop to limit the outward swing of the segment yet permit inward movement thereof, the segment arranged in a recess in the roll, substantially as described.

32. A roll having a printing or type-receiving portion having a recess, a segmental printing-block arranged in the recess and pivoted at its rear end to permit radial swing of its free end, a stop to limit outward swing of the block, a spring or yielding means pressing the block to its limit of outward movement and permitting inward swing of the free end thereof, said roll having a feeding circumference or portion beside said printing portion and formed with a radial recess beside said printing-block, a segmental feeding-block in said recess and forming a portion of the feeding circumference and pivoted at its rear end to permit radial movement of its front end and provided with a stop to limit its outward swing and a yielding device holding it outwardly and permitting inward swing thereof, substantially as described.

33. A separator comprising a reciprocating frame, spring-held, and having inclined engaging faces provided with letter-retarding means, substantially as described.

34. A guiding-wall, in combination with a separator arranged opposite the same and comprising a reciprocating frame having rearwardly-inclined fingers or engaging surfaces provided with letter-retarding means, and a spring holding said frame with said surfaces toward said guide, substantially as described.

35. A guiding-wall along which the letters pass, in combination with a reciprocating frame yieldingly held toward said wall and having rearwardly-inclined letter-engaging fingers or surfaces arranged to be engaged by the letters so that the frame is forced rearwardly a sufficient distance to permit the passage of one letter at a time along the wall while the letters behind the one being fed are held back, and means arranged at said surfaces to retard the letters, substantially as described.

36. A separator comprising a reciprocating frame provided at its inclined letter-engaging portion with letter-retarding means, and a single plate-spring loosely confined to the frame and yieldingly holding the same in its normal position, substantially as described.

37. In a mail-marking machine, the combination of a feedway having a letter-discharge and a guide-wall along which the letters are fed, a positive feeder forcibly carrying the letters through the discharge along the wall, a support opposite the wall, the separator consisting of a frame reciprocating in a straight line toward and from said wall and loosely confined to and guided by said support and having a retarding edge normally held across said discharge toward the guide-wall and provided with letter-retarding means, and a spring yieldingly holding the frame toward said wall and said curved edge across the discharge so that the wedging action of the letters on said edge will force the frame directly back in a straight line to permit the passage of one letter at a time, substantially as described.

38. An opposing guide, in combination with a separator comprising a reciprocating frame yieldingly held in its normal position against said wall and having inclined letter engaging or retarding fingers rigid with the frame so that the pressure of the letters thereon will cause the entire frame and fingers to reciprocate rearwardly and permit the passage of one letter at a time, and letter-retarding means carried by said frame and arranged adjacent to said fingers and pressed against said wall or an interposed letter, substantially as described.

39. A guiding-wall on one side of a letter-discharge passage, in combination with a reciprocating frame on the opposite of the passage having inclined letter retarding and engaging surfaces or fingers normally extending across the passage to the wall, and a plate-spring having its free end springing toward said wall and loosely confined to the frame, substantially as described.

40. A guide having a letter-discharge passage beside the same, in combination with a sliding separator-frame having an inclined finger or edge and letter-retarding means, and a spring or yielding mechanism holding the frame toward the wall and the edge across the passage, substantially as described.

41. In a mail-marking machine, printing mechanism, a feeder to carry the letters thereto, and mechanism to hold back or separate the letters from the particular letter being fed consisting essentially of a reciprocating spring-held frame having a wedge face or portion, whereby each letter reciprocates the frame in a straight line against its spring, said wedge-face provided with letter-retarding means, substantially as described.

42. In a mail-marking machine, the combination of a letter-discharge passage having a guide-wall along one side thereof, in combination with a support opposite the wall, a sliding separator-frame loosely confined to and guided by the support and having rearwardly-inclined fingers rigid therewith and extending across the passage, and a vertically-disposed plate-spring secured at one end with its free end springing toward the guide-wall and formed with a transverse eye, and means passing loosely therethrough and confining the spring to the separator-frame to yieldingly hold the fingers across the discharge, substantially as described.

43. An impression-roll having a smooth finely-divided hard-metal yieldingly-supported impression-surface, substantially as described.

44. An impression-roll having a smooth finely-divided hard-metal impression-surface made up of a plurality of small closely-arranged points or ribs having smooth outer ends all within the circle of the surface, substantially as described.

45. In a mail-marking machine, a roll having a rigid hard ring or cylinder forming the circumferential engaging surface of the roll, a soft yielding body on and around which said cylinder is confined, and a concentric support for the roll, whereby said cylinder can rock or yield laterally independently of said support, substantially as described.

46. An impression-roll having a hard annular concentric surface or integral metal ring, a soft or yielding backing, and an interior hard or metal bushing or bearing, whereby said annular surface can rock in adjusting itself to the surfaces of uneven letters, substantially as described.

47. An impression-roll having a hard impression-surface formed of an integral metal ring or annular body, a core or backing of yielding material, such as rubber, on which the ring is mounted, and a central bearing-tube within the yielding material, substantially as described.

48. An impression-roll having an interior central metal bushing or bearing, a round concentric layer or body of yielding material, such as rubber secured on said bearing, and a concentric hard-metal ring around and secured around the rubber and forming the periphery and impression-surface of the roll, so that said impression-surface can rock in receiving letters of uneven thickness, substantially as described.

49. A hollow roll having a depending shaft, a bearing for the shaft, the internal chamber of said roll open at the top and having a duct from the same opening into the bearing, and a porous or fibrous material in the chamber closing the duct and down through which the lubricant percolates to the duct by gravity, substantially as described.

50. In a mail-marking machine, the combination of a hollow roll open at the top and formed with a depending shaft provided with driving means and a carrier, a roll arranged above and at said open top and provided with its own carrier and support, substantially as described.

51. An impression-roll having a feeding portion mounted on a shaft provided with a movable carrier, the end of the feeding portion being recessed or hollow, and a circular rotary impression portion at the end of the feeding portion and having a movable carrier provided with a depending shaft carrying the impression portion and extending into the hollow end of the feeding portion, substantially as described.

52. A printing-roll having two yielding swinging segments, and an evener stop mechanism therefor, substantially as described.

53. A printing-roll having a swinging yieldingly-held printing-section, a swinging yieldingly-held feeding-section, and an evener-lever stop mechanism controlling the outward swing of said sections arranged so that when one section is pressed in the other section can move the corresponding distance outward, substantially as described.

54. A printing-roll having a printing swinging yieldingly-held section, a swinging yieldingly-held feeding-section beside the same and mounted on the same pivot therewith, said sections having stop-shoulders at their heels, and the lever fulcrumed between its ends with its ends opposite and arranged to engage said stop-shoulders, substantially as described.

55. A feed-roll, and an impression-roll, in combination with a printing-roll having a feeding portion comprising a swinging segment, and a swinging printing-segment, and an evener-lever controlling the outward swing of said segments and mounted in the printing-roll adjacent to each of said segments, substantially as described.

56. A feed-roll yieldingly held, an impression-roll yieldingly held normally out of operative position and controlled by the position of the feed-roll and forced to operative position by the outward movement of the feed-roll, in combination with a printing-roll having a feeding portion coacting with said feed-roll and comprising a swinging feeding-segment, and a printing portion comprising a swinging printing-segment capable of swinging out to the impression-roll before the same has reached its operative position, substantially as described.

57. A receiving way having an adjustable side guide, in combination with a swinging member moving with said guide and closing the space at the front end of the way between said guide and the front end wall, substantially as described.

58. In a mail-marking machine, the combination of a guide-wall, a separator-frame having a spring normally holding the same to said wall across the passage of the letters, and a swinging yielding retainer carried by said frame and provided with a stop edge or shoulder, said retainer constantly tending to project said stop edge beyond the extremity of the frame to catch the ends of letters when the frame is forced back, said retainer normally retracted or forced back by engagement with the wall when the frame is forced thereto, substantially as described.

59. A separator comprising a yieldingly-held reciprocating frame provided with beveled faces having a plurality of swinging spring-held retainers therein and projecting beyond the outer ends thereof, substantially as described.

60. A separator comprising a sliding frame provided with an inclined or cam letter-engaging surface, and having a pivoted rearwardly-swinging spring-held retainer therein provided with a notch or shoulder to catch and hold the letters by their front ends, substantially as described.

61. A separator comprising a reciprocating spring-held frame having rearwardly-beveled front ends, and a spring-held swinging retainer mounted in said frame and arranged to project forwardly beyond the front ends thereof in rear of said beveled portions and catch and hold back the letters behind the one being fed, substantially as described.

62. A printing-roll, in combination with an inking-pad, and a rotary shield driven from the printing-roll and upholding and driving the pad, and shielding the printing-roll from ink except at its printing portion, substantially as described.

63. A printing-roll, in combination with an inking-pad, and a rotary shield larger than the pad and on which the same rests and interposed between the pad and part of the roll, substantially as described.

64. A printing-roll having a feeding portion, an inking-pad, and a rotary shield beneath the pad and extending beneath the same to the printing-roll at a point above the feeding portion and interposed between the pad and the feeding portion of said roll, substantially as described.

65. A printing-roll, in combination with an inking-pad, and a pad-driving rotary shield arranged beneath the pad and upholding the edge of the same, substantially as described.

66. A printing-roll, in combination with a rotary inking-pad, and a shield larger in diameter than the pad and engaging the end thereof, and engaging and rotated by the printing-roll, and thereby rotating the inking-pad at a higher rate of speed, substantially as described.

67. In a stamp-canceling machine, the combination with the frame, of a canceling device mounted thereon comprising a revoluble roller, a feed-block slidably mounted in the frame, an arm eccentrically mounted on said roller and pivotally connected at one end to said feed-block, means for feeding the letters to said feed-block, mechanism for receiving and carrying away the canceled letters, and means for revolving said roller whereby the feed-block will be reciprocated to carry the letters to the canceling device and the free end of said arm will be moved in a manner to directly contact with and knock the letters passing from the canceling device back on the said receiving mechanism.

68. In a stamp-canceling machine, the combination with the frame, of a canceling device mounted thereon comprising a revoluble roller, a feed-block slidably mounted in the frame, an arm eccentrically mounted on said roller and pivotally connected at one end to said feed-block, means for feeding the letters to said block, mechanism for receiving and carrying away the canceled letters, means for revolving said roller whereby the feed-block will be reciprocated to carry the letters to the canceling device and the free end of said arm will be moved in a manner to directly contact with and knock the letters passing from the canceling device back on the said receiving mechanism, and means for preventing the passage of more than one letter or card at a time to the canceling device.

69. An impression-surface, in combination with a printing-roll having an edge type-receiving recess opening through an end of the roll, separate removable type arranged to enter said recess from said end and each type interlocking with the roll against radial movement, and a freely swinging or movable plate arranged flat on said end of the roll and arranged to move over said type and confine them against outward movement, and constructed to permit the same being swung or moved on the end of the roll to expose the type, substantially as described.

70. In combination, an opposing surface along which the letters are forcibly carried, means for forcibly feeding or carrying the letters, and a separating device arranged opposite said surface and comprising a frame loosely held to reciprocate to and from said surface, said frame having an inclined surface at its inner end presented to the letters so that the pressure of the letters thereon will wedge the frame away from said surface to permit passage of a single letter at a time, said inner end provided with means to hold back letters behind the particular letter being fed, and a spring device yieldingly pressing said frame toward said surface, substantially as described.

71. In combination, an opposing surface along which the letters are forcibly fed, means for forcibly feeding the letters, and a separator consisting of a reciprocating frame arranged approximately at right angles to said surface and movable toward and from the same in a straight line to maintain its angle therewith, the inner end of said frame inclined and provided with letter-retarding means holding back letters behind the one being fed so that the frame will move to permit the passage of the particular letter being fed, a support and a flat plate-spring arranged in an approximately upright or vertical position and at one end secured to said support with its free end connected with said frame to yieldingly press the same toward said surface, substantially as described.

72. A separator comprising a reciprocating frame having an inclined surface against which the letters act with a wedging pressure to force out the frame and permit the passage of a single letter at a time, in combination with a support in a vertical plane parallel with said frame, and an upright flat plate-spring secured to said support with its free end extending vertically beside and loosely confined to said frame and yieldingly holding the same toward the letters, said spring arranged to permit reciprocation of the frame, substantially as described.

73. A separator comprising a yieldingly-held reciprocating frame having and containing a spring-held catch or letter-retainer normally retracted within the letter-engaging end of the frame and arranged to project beyond the extremity thereof, substantially as described.

74. A separator comprising a reciprocating movable frame having a wedge or cam face yieldingly held against the letters and provided at its letter-engaging portion with a movable catch or retainer provided with an independent spring, said retainer normally out of operative position and arranged to spring into operative position at the rear of said cam-face when the frame is moved back and to thereby catch the ends of and hold back the letters behind the particular letter being fed past the separator, substantially as described.

75. A hollow or cup-shaped ink-pad driver and shield having a projecting flange to uphold the pad and a friction driving edge or periphery, substantially as described.

76. A printing-roll, and an inking-pad therefor, in combination with a shield of greater diameter than the pad and arranged beneath the same with the edge of the shield extending to, or almost to, the printing-roll and engaging the bottom of the pad adjacent said roll, substantially as described.

77. A rotary-driven ink-pad shield and driver, in combination with an ink-pad resting on or engaging and rotated by said shield, and means for rotating the shield, substantially as described.

78. In combination, a printing-roll, an inking-pad, and a shield having an edge on which the edge of the pad adjacent or engaging the roll rests to prevent flaring of the pad, substantially as described.

79. In a mail-marking machine, the combination of a roll having a top depression or chamber and a depending shaft with an oil-duct from said depression down to the exterior of the shaft, a carrier for said roll, driving means, a roll above said first-mentioned roll having a support with a shaft depending into said depression, substantially as described.

80. A printing-roll having an edge recess, a printing-block fitted therein, means removably securing said block, printing-type removably interlocking with and resting on said block, and means for holding the type, substantially as described.

81. A printing-roll, series of removable type held against outward and lateral play, each having a lateral locking projection, and each separately removable independently of the remaining type, and a swinging plate flatly fitting and turning on the roll and holding the type in position, substantially as described.

82. A printing-roll having series of removable type interlocking therewith against outward movement, and a laterally-swinging flat type-locking plate fitting said roll and turning thereon, substantially as described.

83. A printing-roll having removable type interlocking therewith against outward movement, and a laterally-swinging type-locking plate arranged on the roll and a stop limiting the swing of the plate in one direction, substantially as described.

84. A printing-roll having separately-removable printing characters, and a laterally-swinging type-locking-plate arranged flat on said roll provided with holding means independent of the roll-securing mechanism, substantially as described.

85. In a mail-marking machine, the combination of a feedway, a receiving-way, an interposed rotary member, a feeder, and an operating connection between said member and said feeder having its end extended to directly engage the letters and force them in said receiving-way, substantially as described.

86. A separator-frame having an inclined letter-engaging face, and a pivoted letter-retarding stop carried by said frame and projecting therethrough beyond and at the rear of said inclined face, substantially as described.

87. A spring-held movable separator held against lateral movement and having an inclined letter-engaging face and a pivoted letter-retarding stop at the rear end or termination of said incline, substantially as described.

88. A movable separator-frame having an inclined letter-engaging face rigid therewith, a slot in the frame, and a swinging letter-retarding stop pivoted in the frame with a shouldered or catch end arranged to extend through said slot, substantially as described.

89. A movable separator-frame provided with and carrying a swinging finger pivoted thereto and extending rearwardly with an abrupt or shouldered end in rear of its pivot, substantially as described.

90. A rotary inking-pad, in combination with a rotary support engaging one end of said pad at or near its edge, and driving means for said support, substantially as described.

91. A rotary inking-pad, and a support having an edge or flange engaging one end of said pad at or near its edge, substantially as described.

92. A printing-roll, an inking-pad arranged opposite a portion only of the roll, and a support having a projecting edge or flange engaging an end of said roll and interposed between the same and a portion of said printing-roll, substantially as described.

93. In a stamp-canceling machine, the combination with the frame, of a canceling device mounted thereon comprising a revoluble roller, a feed-block slidably mounted in the front plate of the machine for carrying the letters to the canceling device, means for reciprocating said feed-block, means for feeding the letters to said feed-block, mechanism for receiving and carrying away the canceled letters, and an arm carried by said roller and actuated in the revolution thereof to directly contact with and knock the canceled letters back on the receiving mechanism.

94. In a mail-marking machine, in combination a reciprocating feeder, a printing mechanism embracing a rotating roll, a receiving-way, and a connection from the feeder eccentrically coupled to the roll and having its free end extended and forming a stacker, substantially as described.

95. In a mail-marking machine, the combination of letter-receiving mechanism, a printing mechanism comprising a rotating roll, an arm carried and actuated by said roll to directly engage the letters passing from the printing mechanism and stack or force them in the receiving mechanism and controlling means for said arm, substantially as described.

96. In a mail-marking machine, the combination of a printing mechanism, a receiving mechanism into which the letters from the printing mechanism are discharged, and a stacker comprising an arm carried by a member of the printing mechanism and timed thereby to directly engage each letter discharged from the printing mechanism and controlling means for said arm, substantially as described.

97. In a mail-marking machine, the combination of a feedway, a receiving-way, interposed letter-moving mechanism, a reciprocating feeder, a connection from said feeder having its opposite end extended to directly engage the letters and force them in the receiving-way, and actuating means therefor applied to said connection between the feeder and said extended end, substantially as described.

98. In a mail-marking machine, the combination of a feedway, a receiving-way, printing mechanism interposed in the letter-path between said ways, feeding means to feed the letters from said feedway to the printing mechanism, and a separating mechanism interposed in the letter-path between the feedway and printing mechanism, and comprising an opposing member on one side of said path, and a reciprocating slide or member provided with a spring mechanism yieldingly holding said reciprocating member toward said opposing member and across the letter-path, the inner end of said reciprocating member having a beveled or inclined letter-engaging face, whereby the pressure of the letters against said inclined face causes a backward reciprocation of said reciprocating member to permit the passage of one piece of mail-matter at a time to the printing mechanism, substantially as described.

99. In a mail-marking machine, the combination of a feedway, a receiving-way, printing mechanism interposed in the letter-path between said ways, feeding mechanism to feed the letters from the feedway to the printing mechanism, a guide-wall along said letter-path, a wall arranged opposite and approximately at right angles to said guide-wall, a reciprocating member beside and guided in its movements by said wall, and a spring mechanism yieldingly holding said reciprocating member to said guide-wall and across the letter-path, the inner end of said reciprocating member formed with an inclined or beveled letter-engaging face rigid therewith, whereby the pressure of a letter against said face wedges back the said member in a straight line and permits the passage of one letter at a time to the printing mechanism, substantially as described.

100. A mail-marking machine having a spring-held sliding or reciprocating separator member movable in a straight line approximately at right angles to the plane of the letter-path and provided with a beveled or inclined wedge letter-engaging face or end, substantially as described.

101. In a mail-marking machine, the combination of a guide along which the mail-matter moves, an elevated support, a plate-spring fixed thereto and depending therefrom, and a separator held against lateral movement and confined to said spring and yieldingly held thereby toward said guide, substantially as described.

102. In a mail-marking machine, the combination, of a guide, a frame, a vertically-disposed plate-spring affixed to said frame, and a reciprocating separator-frame confined to the free end of said spring and pressed thereby toward said guide, substantially as described.

103. In a mail-marking machine, the combination of a receiving-way into which the letters are discharged in an upright position, a rotary driver, and a rearwardly-curved yielding spring stacker-finger carried by said driver in an encircling path into and out of said way and adapted to engage the letters therein and yield rearwardly under the pressure of engagement therewith, substantially as described.

104. In combination, in a mail-marking machine, a receiving-way, means to discharge the letters thereinto, a bar arranged longitudinally of one side of said way to form a letter-stop, said bar pivoted to swing transversely of the way, and means to hold the same in the desired adjustment, substantially as described.

105. In a mail-marking machine, the combination, of a printing-roll, an impression-roll therefor, one of said rolls normally withdrawn from operative position, a movable member normally in the path of the letters to said rolls, and a lever mechanism between and positively connecting said member and normally withdrawn roll comprising a lever or member having a movable spring-pressed or yielding fulcrum, substantially as described.

106. In a mail-marking machine, the combination of two letter-ways arranged side by side and at their front ends terminating in about the same vertical plane, the letters passing from the front inner corner of one way into the front inner corner of the other way, a printing mechanism interposed between the front ends of said ways and in said path of the letters comprising a positively-driven printing-roll, an idler concentric-surface impression-roll, controlling means for said impression-roll normally holding the same bodily withdrawn laterally from operative printing position with respect to the printing-roll, a movable member held yieldingly in said path of the letters about at the point where letters pass between the said rolls and positively connected with and actuating said controlling means to force the impression-roll bodily and laterally into operative printing relation with the printing-roll on the entrance of a letter between said rolls, a spring mechanism acting on said impression-roll, controlling means and member, and a transversely-movable feeding device forcibly carrying the letters into said rolls, substantially as described.

107. A printing-roll in combination with an impression-roll, one of said rolls normally held from operative position and out of the path of the mail-matter between the rolls, a member normally extending into the path of the mail-matter, a lever connection between said member and said normally retracted roll so arranged that the long end of the lever moves said roll an increased distance toward the opposing roll when said member is moved to permit passage of a piece of mail-matter, and a spring device acting on said member and said normally retracted roll, so said roll can yield outwardly without pressing said member inwardly, substantially as described.

108. In combination, a printing-roll, an impression-roll, one of said rolls normally retracted from printing or operative position, a movable member normally in the path of the letters and arranged on the same side of said path as said normally retracted roll, a lever mechanism comprising a lever having long and short arms, the short arm of the lever connected with said member and the long arm of the lever controlling said normally retracted roll so that when said member is forced out by a piece of mail-matter the long arm of the lever imparts an increased movement to said roll in bringing the same to operative position, substantially as described.

109. In combination, a printing-roll, an impression-roll one of said rolls normally retracted from operative position, a movable carrier therefor, a member normally in the path of the mail-matter, a lever pivotally joined to said carrier and having its opposite portion loosely confined to said member, and a single spring mechanism acting on said lever to hold said roll and said member yieldingly in their various positions, whereby said roll can yield to the mail-matter without pressing said member inwardly, substantially as described.

110. In a mail-marking machine, the combination of a printing-roll, an impression-roll, one of said rolls normally retracted bodily from operative printing position a carrier for said normally retracted roll, means insuring registry of the printing-roll die with the desired place on each piece of mail-matter, and a spring-controlled member yieldingly extending into the path of the letters moving into said rolls, and positively connected with said carrier and forcing the same to move the normally retracted roll bodily into operative printing position on the passage of a letter into said rolls, substantially as described.

111. In combination, a printing-roll, an impression-roll, one of said rolls normally retracted bodily from operative printing position, and a spring-controlled member extending into the path of the letters at the space between said rolls and connected to force said normally retracted roll into operative printing relation to the other roll on the entrance of a piece of mail-matter between the rolls, substantially as described.

112. In combination, a printing-roll, an impression-roll, one of said rolls normally held from operative position, a controlling connection positively connected with and arranged to move said roll and provided with a positive actuating means extending into the path of the letters as they pass to said rolls, and a spring device yieldingly holding said roll in its normal position and said means in the path of the letter, and acting on said connection to permit yielding of said member and roll oppositely and also simultaneously in the same direction, substantially as described.

113. In combination, a printing-roll, an impression-roll, one of said rolls normally held from operative position, a differential lever controlling connection for said roll provided with a member yieldingly extending into the path of the letters to said rolls, a spring device yieldingly holding said roll and member in their normal positions through the medium of said connection, and a positive feeding means to pull the letters against and slightly force out said member and thereby through the medium of said connection throw the roll an increased distance to its operative position.

114. In combination, a printing-roll, an impression-roll, a controlling connection for one of said rolls provided with a member extending into the path of the letters to said rolls, and a single spring device acting on said connection to yieldingly and normally hold said roll bodily from operative position and said member in the path of the letter, said member connected to force said roll bodily and laterally into operative position on being moved by a letter passing to the rolls.

115. An impression-roll having a feeding portion mounted on a shaft carried by a movable support and provided with driving means and an impression portion at an end of the feeding portion and carried by a separate movable support, and means controlling and yieldingly holding both portions of the impression-roll, substantially as described.

116. A printing-roll in combination with an impression-surface, a sliding support therefor, a spring device normally holding the impression-surface out of operative position and away from the printing-roll, and means for moving the support to bring the impression-surface into operative position and to throw the tension of the spring thereon to yieldingly hold the surface in operative position, substantially as described.

117. In a mail-marking machine, the combination of a printing-roll, an impression-surface normally held out of operative position and away from the roll, and means in the path of the letters as they reach the printing-roll and arranged to be moved by each letter, an evener between said means and the impression-surface to bring the impression-surface to operative position as a letter reaches the printing-roll, and timing mechanism, whereby each piece of mail-matter properly registers with the die of the printing-roll, substantially as described.

118. In a mail-marking machine, the combination of a printing mechanism comprising a printing-roll and an impression-surface, a carrier for the impression-surface normally holding the same from operative position and from the roll, a movable body in the path traversed by the letters in moving into the printing mechanism and yieldingly held in position so as to be moved out by each letter, an evener mechanism between said body and said carrier whereby the impression-surface is moved into operative position positively as each letter is presented to the printing mechanism, and a spring device, said impression-surface having an independent yielding movement away from the printing-roll, substantially as described.

119. A printing-roll having a letter-feeding portion in combination with an impression-roll comprising a feeding portion yieldingly held toward the feeding portion of the printing-roll, and an impression portion provided with a separate carrier and normally held from operative position with respect to the printing portion of the printing-roll, an evener device between the feeding portion of the impression-roll and the said carrier, and a spring device, whereby as each letter moves out the feeding portion of the impression-roll the evener moves in the carrier and carries the impression portion into operative position, substantially as described.

120. A printing-roll, in combination with a feeding-roll yieldingly held toward a coacting feeding-surface, an impression-surface having a carrier and normally held from operative position and movable independently of said feeding-roll, a loose positive connection between said carrier and the feeding-roll so that when the feeding-roll is moved out by each letter the carrier moves the impression-surface to operative position, and a spring yieldingly holding the feeding-roll in constant operative position and normally holding the impression-surface in operative position when the feeding-roll moves out.

121. A printing-roll having printing and feeding portions, in combination with an impression-roll having a coacting feeding portion provided with a shaft and a movable carrier, and a rotary circular impression-surface arranged at the end of the feeding portion and provided with a separate shaft, a movable carrier for the impression-surface, an evener-lever loosely joined to the feeding portion of the impression-roll and at its opposite portion loosely joined to the impression-surface carrier, a fulcrum for said lever disconnected therefrom, a spring pressing said lever normally against said fulcrum and against the portion thereof opposite the carrier so as to normally hold the impression-surface out of operative position and the feeding portion constantly in operative position and so that when the feeding portion moves to receive a letter the lever is forced from the fulcrum and rocks at its point of contact with said spring to throw the carrier to carry and yieldingly hold the impression-surface in operative position, substantially as described.

122. An impression-roll of a mail-marking machine having a feeding portion and an impression-surface mounted on a separate shaft from the feeding portion and normally held out of operative position, connections between said feeding and impression portions, a spring device, and a printing-roll, substantially as described.

123. A mail-marking machine having a printing-roll with a feeding portion in combination with a feed-roll coacting with said feeding portion, feed-roll-rotating means and a yieldingly-held independently-mounted impression-surface yieldingly held with a lighter pressure than the feed-roll, substantially as described.

124. A printing-roll in combination with a positively-driven feed-roll yieldingly held, and an idler impression-roll normally held from operative position and connected with and moved to operative position by the outward movement of the feed-roll, and timing mechanism whereby the die of the printing-roll registers with each piece of mail-matter at the proper point, substantially as described.

125. In a mail-marking machine, the combination of printing mechanism comprising a printing and an impression roll, one of said rolls normally retracted from operative position, a movable yieldingly-held member pressed aside or moved by each advancing piece of mail-matter, a sliding member having an adjustable stop to control the movement of said normally retracted roll toward the other roll, a spring acting thereon, to yieldingly hold the roll and said member in their normal positions and permit the same to yield to the mail-matter, and a connection whereby the yielding of said member under the influence of the advancing mail-matter forces said roll into operative position with respect to the mail-matter, substantially as described.

126. In a mail-marking machine, the combination of a printing-roll, an impression-roll, one of said rolls normally held idle and out of operative position and from contact with the other roll, a movable yieldingly-held member moved and operated by each advancing piece of mail-matter, positive connections between said member and roll comprising a lever device arranged to force said roll in against the mail-matter so as to be rotated thereby and coact with the opposite roll when said member is moved or actuated under the influence of the advancing mail-matter, and a spring device yieldingly holding said roll and member in their normal positions and also yieldingly holding said roll to the mail-matter when said roll is moved to operative position, substantially as described.

127. In a mail-marking machine, the combination of a constantly-rotating printing-roll, an idler impression-roll normally held from operative position and from contact with the printing-roll and normally idle, mechanism whereby each piece of mail-matter is presented to said rolls at a certain fixed period in the rotation of the printing-roll, a movable yielding member arranged to be moved or actuated by each advancing piece of mail-matter as the same is presented to said rolls, positive connections between said member and said impression-roll and actuated by said member to press said roll into forcible contact with the mail-matter and so as to be rotated thereby, and a spring device holding the impression-roll to its work when in operative position.

128. In a mail-marking machine, the combination of a positively-driven continuously-rotated printing-roll, a positively-driven continuously-rotated feed-roll coöperating with the printing-roll, a movable spring-pressed carrier for the feed-roll, an idler impression-roll coöperating with the printing characters of the printing-roll, a spring-pressed carrier movable toward and from the printing-roll and carrying the impression-roll, and a stop limiting the movement of the impression-roll toward the printing-roll, substantially as described.

129. In a mail-marking machine, the combination of a positively-driven printing-roll, a swinging spring-pressed carrier, a shaft mounted in the free end thereof, rotating means applied to one end of said shaft, a feed-roll on the shaft coöperating with the printing-roll, a spring-pressed slide movable toward and from the printing-roll, and the idler impression-roll carried thereby and coöperating with the printing-roll, substantially as described.

130. In a mail-marking machine, the combination of a positively-driven printing-roll, a sliding spring-pressed support reciprocating toward and from the printing-roll independently of the rotation thereof, an impression-roll carried by said support, and a stop limiting movement of the support toward and maintaining the impression-roll from contact with the printing-roll, substantially as described.

131. In a mail-marking machine, the combination of a positively-driven printing-roll, a spring-held movable carrier, a positively-driven continuously-rotating feed-roll carried thereby and coöperating with the printing-roll, an idler impression-surface arranged end to end with said feed-roll, a movable spring-held support for said impression-roll having a light spring tension and a different path or range of movement than said feed-roll, whereby the printing and feed rolls forcibly grip and move each letter and the impression-roll presses the same against the type, substantially as described.

132. In a mail-marking machine, the combination of a positively-driven printing-roll, positively-driven means for carrying each letter past said roll, an idler impression-roll, a sliding carrier therefor, a stop limiting the movement of said roll toward and maintaining it from direct contact with the printing characters of the printing-roll, a support, and a vertically-disposed plate-spring carried by the support and acting on said carrier, substantially as described.

133. A mail-marking machine provided with two approximately parallel letter-ways arranged about in the same horizontal plane and ending in about the same transverse plane with a transverse letter-path from the front of one to the front of the other, printing mechanism arranged between the front ends of said ways comprising a positively-driven printing-roll, an idler impression-roll, a reciprocating spring-held slide to force the impression-roll toward the printing-roll, a stop limiting the movement of said reciprocating slide toward the printing-roll, said reciprocating slide arranged in a plane parallel with and between the plane of said ways, and means to carry the letter through said printing mechanism, substantially as described.

134. In a mail-marking machine, the combination of two letter-ways arranged side by side, a printing mechanism arranged between their front ends, a feeder carrying the letters from one way into said printing mechanism, said mechanism comprising a positively-driven printing-roll, a positively-driven feed-roll, coöperating therewith, a spring-pressed slide or support reciprocating toward and from and independently of the movement of the printing-roll, an impression-surface carried by said support, and a stop limiting the movement of said support and maintaining the impression-surface from contact with the printing devices, substantially as described.

135. In a mail-marking machine, the combination of a positively-driven printing-roll, a positively-driven feed-roll, a spring-pressed support having a path of reciprocation toward and from the printing-roll and movable independently of the rotation of the printing-roll, an impression-roll carried by said support, and an adjustable stop mechanism for said support maintaining the impression-surface from contact with the printing devices, substantially as described.

136. In a letter marking or printing device comprising a printing part, a letter-receiving part adapted to receive a series of letters, a separating device for separating the letters so that they may be delivered singly to the printing part, an additional feeding device adapted to receive the letters after separation and provided with a part normally in an inoperative position, which coöperates with the printing part, and which is actuated by the presence of a letter so as to be brought into operative relation with the canceling part.

137. A letter marking or printing device comprising two letter-receiving parts between which the letter passes, and adapted to be moved relatively by said letter, two coöperating printing or marking devices, a movably-mounted arm or part connecting one of the letter-receiving parts with one of the printing or marking parts, means for normally holding said arm so that the associated letter-receiving part will be pressed against its coöperating part while the associated printing or marking part will be held away from its coöperating part when no letter is being fed to the marking part, whereby when a letter is inserted between the letter-receiving parts said arm is moved so as to separate the letter-receiving part and move the printing or marking part into proper position with its coöperating part.

138. A letter-stamp canceling or printing device comprising a printing mechanism having a movable portion with the trip mechanism therefor having a movable portion, the two said movable portions being connected so as to move together, and a yielding pressure device which permits the movable portion of the printing mechanism to recede without affecting the position of the movable portion of the tripping mechanism.

139. In a mail-marking machine, the combination of a printing-roll, an impression-roll, one of said rolls normally withdrawn from operative printing position with respect to the other roll, and an actuating member yieldingly held in position to be moved or actuated by each piece of mail-matter passing to said rolls and connected with said normally withdrawn roll to positively force the same to operative position on the passage of a piece of mail-matter to the rolls, said normally withdrawn roll having a yielding movement away from the other roll independent of said member, substantially as described.

140. In a mail-marking machine, the combination with feed mechanism, of a printing-cylinder, an impression-roller, yieldingly mounted adjacent thereto, normally out of contact therewith, a second roller yieldingly mounted against said printing-cylinder, and means connected with said second roller for causing the impression-roller to be pressed against a mail-piece passing between said roller and the printing-cylinder.

141. In a mail-marking machine, the combination with a feed mechanism, of a printing-cylinder mounted in fixed bearings, an impression-roller mounted on a frame movable with respect to said printing-cylinder, said impression-roller being normally out of contact with the printing-cylinder, a second roller mounted against said printing-cylinder on a frame movable with respect thereto and a connection between the frames carrying said impression-roller and said second roller, whereby the movement of said second roller caused by the passage of a mail-piece between it and the printing-cylinder will cause said impression-roller to be pressed against said mail-piece, thereby pressing the same against the printing-cylinder.

In testimony whereof I affix my signature in presence of two witnesses.

WILLIAM BARRY.

Witnesses:
 Wm. V. Burr,
 H. L. Howe.

It is hereby certified that in Letters Patent No. 769,458, granted September 6, 1904, upon the application of William Barry, of Oswego, New York, for an improvement in "Mail-Marking Machines," an error appears in the printed specification requiring correction, as follows: The following paragraph, constituting lines 77–83, inclusive, page 11, to wit:

"The normally withdrawn impression-roll with mechanism operated by each letter as it is carried into the printing mechanism, to move said roll to operative position, is not claimed in this application broadly, but forms the subject-matter of a divisional application filed by me October 26, 1897."

should be stricken out; and that the said Letters Patent should be read with this correction therein that the same may conform to the record of the case in the Patent Office.

Signed and sealed this 18th day of October, A. D., 1904.

[SEAL.]

E. B. MOORE,
*Acting Commissioner of Patents.*